US011683291B2

(12) United States Patent
Velugu et al.

(10) Patent No.: US 11,683,291 B2
(45) Date of Patent: Jun. 20, 2023

(54) AUTOMATICALLY GENERATING FIREWALL CONFIGURATION PROFILES USING LEARNING MODE

(71) Applicant: Citrix Systems, Inc., Fort Lauderdale, FL (US)

(72) Inventors: Kasirao Velugu, Bengaluru (IN); Priya Bagaria, Kolkata (IN); Ganesh Kathiresan, Bangalore (IN); Thirumoorthi Thangamani, Pallipalayam (IN)

( * ) Notice: Subject to any disclaimer, the term of this patent is extended or adjusted under 35 U.S.C. 154(b) by 142 days.

(21) Appl. No.: 17/307,713

(22) Filed: May 4, 2021

(65) Prior Publication Data
US 2022/0360560 A1 Nov. 10, 2022

(51) Int. Cl.
*H04L 29/00* (2006.01)
*H04L 9/40* (2022.01)
*G06N 20/00* (2019.01)

(52) U.S. Cl.
CPC ......... *H04L 63/0263* (2013.01); *G06N 20/00* (2019.01); *H04L 63/10* (2013.01); *H04L 63/1433* (2013.01)

(58) Field of Classification Search
CPC . H04L 63/0263; H04L 63/10; H04L 63/1433; G06N 20/00
See application file for complete search history.

(56) References Cited

U.S. PATENT DOCUMENTS

| 9,049,122 | B2* | 6/2015 | Andersen | H04L 61/2589 |
| 9,736,019 | B2* | 8/2017 | Hardison | H04L 41/0809 |
| 10,523,549 | B1* | 12/2019 | Belikovetsky | H04L 67/02 |
| 11,356,419 | B1* | 6/2022 | Nosalis | G06F 16/252 |
| 2011/0214157 | A1* | 9/2011 | Korsunsky | H04L 63/1425 726/1 |
| 2011/0219035 | A1* | 9/2011 | Korsunsky | G06F 21/00 707/E17.005 |
| 2011/0238855 | A1* | 9/2011 | Korsunsky | H04L 63/1441 709/231 |
| 2012/0240185 | A1* | 9/2012 | Kapoor | H04L 41/0866 726/1 |
| 2013/0042298 | A1* | 2/2013 | Plaza Fonseca | H04L 67/52 726/1 |

(Continued)

FOREIGN PATENT DOCUMENTS

WO WO-2019182489 A1 * 9/2019 ......... H04L 63/0227

*Primary Examiner* — Don G Zhao

(57) ABSTRACT

Described embodiments provide systems and methods for generating firewall configuration profiles for firewalls. An intermediary device may modify a request from a client to access the server to include a payload provided by the device. The payload may include an action type selected from a plurality of action types used to probe the server for a corresponding security vulnerability of a plurality of security vulnerabilities. The device may transmit, to the server, the request including the payload to cause the server to provide a response to the device. The device may determine that the server is susceptible to a security vulnerability of the plurality of security vulnerabilities corresponding to the action type based at least on the response. The device may generate a configuration profile for the firewall to restrict requests of the action type to access the server from clients.

20 Claims, 13 Drawing Sheets

(56) References Cited

U.S. PATENT DOCUMENTS

| | | | |
|---|---|---|---|
| 2015/0143502 A1* | 5/2015 | Peterson | H04L 63/0245 726/11 |
| 2016/0099963 A1* | 4/2016 | Mahaffey | G06F 21/554 726/25 |
| 2016/0261715 A1* | 9/2016 | Luria | H04L 63/02 |
| 2017/0270303 A1* | 9/2017 | Roichman | G06F 11/3668 |
| 2020/0336507 A1* | 10/2020 | Lee | G06F 21/53 |
| 2021/0075794 A1* | 3/2021 | Gazit | H04L 63/1408 |

* cited by examiner

AUTOMATICALLY GENERATING FIREWALL CONFIGURATION PROFILES USING LEARNING MODE

FIELD OF THE DISCLOSURE

The present application generally relates to configuring firewalls. In particular, the present application relates to systems and methods for automatically generating firewall configuration profiles using advanced learning mode.

BACKGROUND

A firewall may function as a barrier among network nodes. The firewall may monitor incoming and outgoing network traffic communicated by the network nodes, and may control the flow of network traffic in accordance with a security policy. The security policy may be manually configured by a network administrator.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

In a networked environment, a firewall may reside on a gateway (also referred herein as a router, a proxy, or an intermediary) separating nodes of a protected network from nodes of an external, unprotected network. On the gateway, the firewall may monitor and control incoming network traffic from the external network as well as outgoing network from the nodes of the protected network. One type of firewall may be a web application firewall (WAF) that monitors and controls network traffic for a particular web application or service. For example, the WAF may monitor and control requests from clients to access resources hosted on a server for the web application as well as responses from the server in response to the requests.

Although able to provide security protections, configuring firewalls (e.g., WAFs) on gateways may be difficult and cumbersome. For one, vendors of firewalls may provide a plethora of security protections. Administrators managing protected networks may have to spend significant amounts of time and effort in evaluating the myriad of available protections provided by the vendors. The amount of time and effort in properly and correctly configuring the firewall may be especially exacerbated, given the sensitive nature of protecting network security. For another, enabling security protections that are not needed may lead to wasteful consumption of computer resources (e.g., high processor usage) and network bandwidth (e.g., low throughput and high latency) at the gateway, and in an overall decrease in performance. The enabling of such protections may also result in poor user experience, with denial of service to non-threatening network traffic from genuine users of the application. On the contrary, disabling necessary protections or insufficiently configuring such protections may result in exposure of the web application and users to various security vulnerabilities.

One approach to address some of these drawbacks may be to deploy the firewall in staging environment, prior to a production environment, to simulate and test network traffic between clients and servers communicating data for an application. While in the staging environment, an external scanner may be used to analyze the test network traffic exchanged between the clients and servers, and the results of the analysis may be used to set the configuration parameters for the firewall. This bifurcation, however, may restrict clients and server outside the staging environment from communicating with one another, thereby excluding access to the application and delaying the full deployment to the production environment. Not to mention that the network traffic within the staging environment may be limited and simulated, and may considerably deviate from actual network traffic that the firewall will process in the production environment.

To address these and other technical challenges, a configuration profile may be automatically generated for the firewall using a subset of network traffic. A learning mode may be added to the gateway, the firewall, or the ADC for the configuring of the firewall. The learning mode can be run while the firewall is in the staging environment or in the production environment. When in learning mode, a packet engine executing on the gateway (or an application delivery controller (ADC)) may intercept a request received from a client to access a resource hosted on the backend server for a particular application. Upon interception, the packet engine may modify the request to inject an attack payload to check for possible vulnerabilities at the server. The packet engine may then forward the request injected with the attack payload to the server, and the server may return a response to the request.

With receipt, the packet engine may inspect the response by checking the content against patterns that are related to various potential vulnerabilities. The packet engine may also inspect whether the received content is in line or different from the expected content. For example, the packet engine may compare a length of a uniform resource locator (URL) in the response against a maximum length as defined by one of the patterns to determine whether the server is susceptible to buffer overflow. When the contents of the response match one of the patterns, the packet engine may determine that the server is susceptible to the security vulnerability corresponding to the pattern. Based on the determination, the packet engine may generate a configuration profile to enable a security check for the particular security vulnerability. The packet engine may also set the configuration profile to disable other security checks for security vulnerabilities determined to not be present on the server.

Once generated, the packet engine may provide the configuration profile as a recommendation to the network administrator. The packet engine may also automatically proceed to apply the configuration profile to the firewall. Prior to moving the firewall to the production environment, the gateway may be set off from learning mode and the firewall may be deployed from the staging environment into the production environment. When in the production environment, the firewall may continue to be in learning for a trusted subset of clients. Under this setting, the packet engine may select a request for use in generating the configuration profile based on whether the client that sent the request is one of a trusted set of clients. Other requests may be forwarded to the server without additional processing. The packet engine may update or adjust the configuration profile for the firewall; for example, to relax the strictness of the security checks.

In this manner, the packet engine on the gateway may be able to generate configuration profiles for the firewall that accounts for the security vulnerabilities that are particular to the server hosting resources for the application. As the configuration profile is specific to the security vulnerabilities of the server, the firewall may be configured with the proper and correct amount of security checks. Furthermore, consumption of computing resources and network bandwidth from applying policies not applicable to the server may be freed up and conserved. The conservation of computing resources and network bandwidth may result in the overall improvement to the performance of the firewall, the gateway, or the ADC. Moreover, the automatic generation of the configuration profile may also reduce or eliminate the burden to network administrators in manually configuring firewalls on gateways. In addition, since the packet engine can use a subset of the network traffic in generating the configuration profiles, the firewall may be deployed on the gateway without delay caused by the division between the staging environment and the production environment.

Aspects of the present disclosure are directed to systems, methods, and non-transitory computer readable media for generating firewall configuration profiles for firewalls. A device intermediary between a plurality of clients and a server may modify a request from a client of the plurality of clients to access the server to include a payload provided by the device. The payload may include an action type selected from a plurality of action types used to probe the server for a corresponding security vulnerability of a plurality of security vulnerabilities. The device may transmit, to the server, the request including the payload to cause the server to provide a response to the device. The device may determine that the server is susceptible to a security vulnerability of the plurality of security vulnerabilities corresponding to the action type based at least on the response. The device may generate a configuration profile for the firewall to restrict requests of the action type to access the server from the plurality of clients.

In some embodiments, the device may determine that the server is not susceptible to a second vulnerability of the plurality of security vulnerabilities corresponding to a second action type of the plurality of action types based at least on a second response to a second request including a second payload comprising the second action type. In some embodiments, the device may generate a second configuration profile for the firewall to permit requests of the second action type to access the server from the plurality of clients.

In some embodiments, the device may determine that a second response from a server is to be restricted in accordance with the configuration profile for the firewall. In some embodiments, the device may identify, based at least on the determination that the second response is to be restricted, a level of violation of the second response. In some embodiments, the device may modify the configuration profile using the level of violation determined for the second response.

In some embodiments, the device may identify, responsive to determining that the server is susceptible to the security vulnerability, at least one of a level of security check or a level of counteraction for the security vulnerability based at least on the response. In some embodiments, the device may generate the configuration profile for the firewall in accordance with at least one of the level of security check or the level of counteraction.

In some embodiments, the device may identify, from the plurality of clients, the client as trusted for generation of the configuration profile, and a second client as not trusted. In some embodiments, the device may select the request to access the server from the client identified as trusted to modify to include the payload, concurrent with not selecting a second request to access the server from the second client identified as not trusted.

In some embodiments, the device may determine that a second response from the server is transmitted in response to a second request from a second client device of the plurality of clients identified as not trusted. In some embodiments, the device may apply a default configuration profile of the firewall to determine whether to permit or restrict the second response from the server.

In some embodiments, in response to setting the device to a mode for generation of the configuration profile using requests from a subset of the plurality of clients, the device may modify the request from the client to access the server to include the payload. In some embodiments, the device may determine that the response includes data matches at least one pattern defined for the security vulnerability.

In some embodiments, in response to setting the device to a mode for use of the configuration profile, the device may apply the configuration profile to the firewall to restrict responses from the server transmitted in response to corresponding requests from at least one of the plurality of clients. In some embodiments the device may provide, for display, information identifying the configuration profile for the firewall to restrict requests of the action type.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
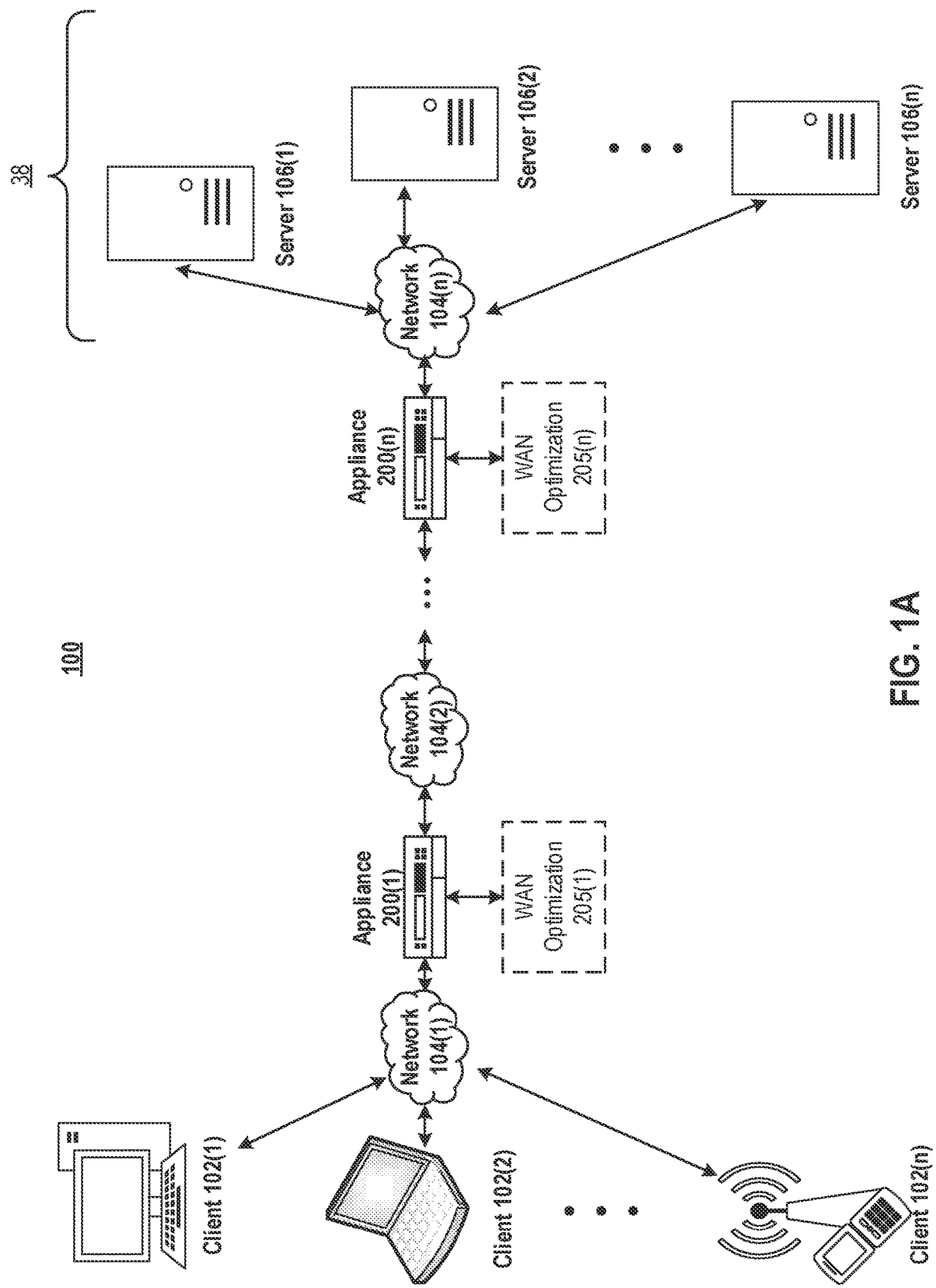
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for generating configuration profiles for firewalls.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix ADC® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
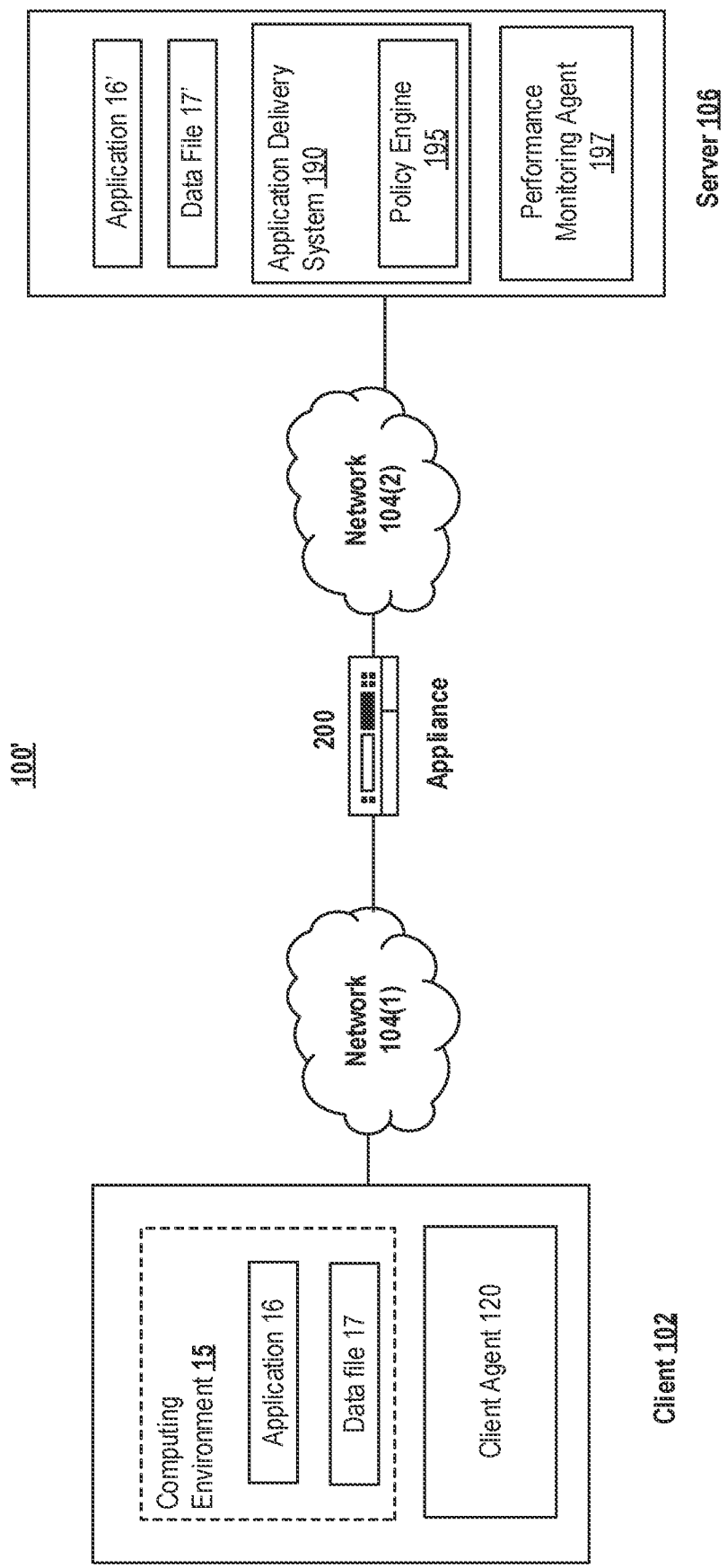
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management, and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection; network latency; bandwidth utilization; end-user response times; application usage and performance; session connections to an application; cache usage; memory usage; processor usage; storage usage; database transactions; client and/or server utilization; active users; duration of user activity; application crashes, errors, or hangs; the time required to log-in to an application, a server, or the application delivery system; and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
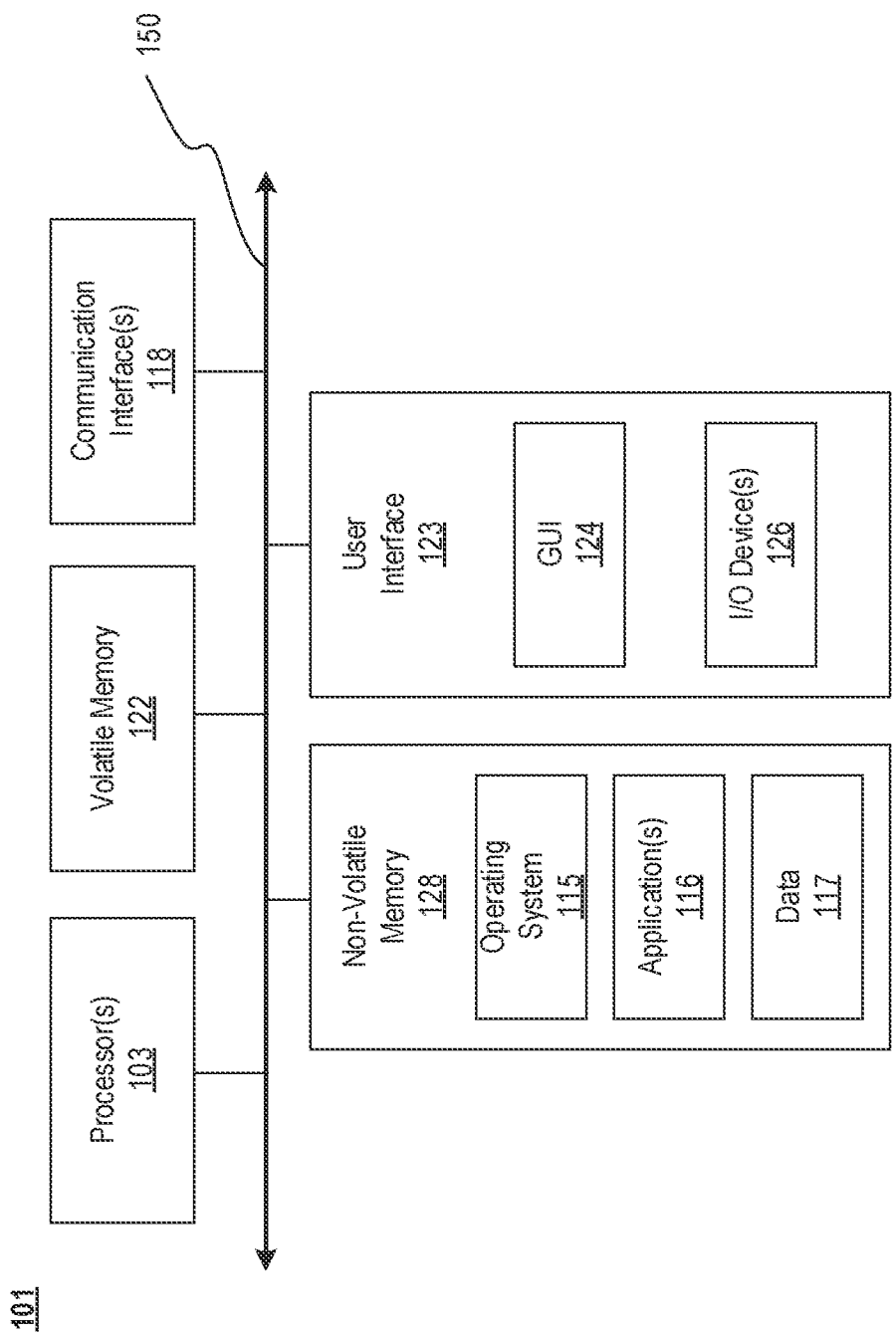
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores an operating system 115, one or more applications 116, and data 117 such that, for example, computer instructions of operating system 115 and/or applications 116 are executed by processor(s) 103 out of volatile memory 122. Data may be entered using an input device of the GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102) such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
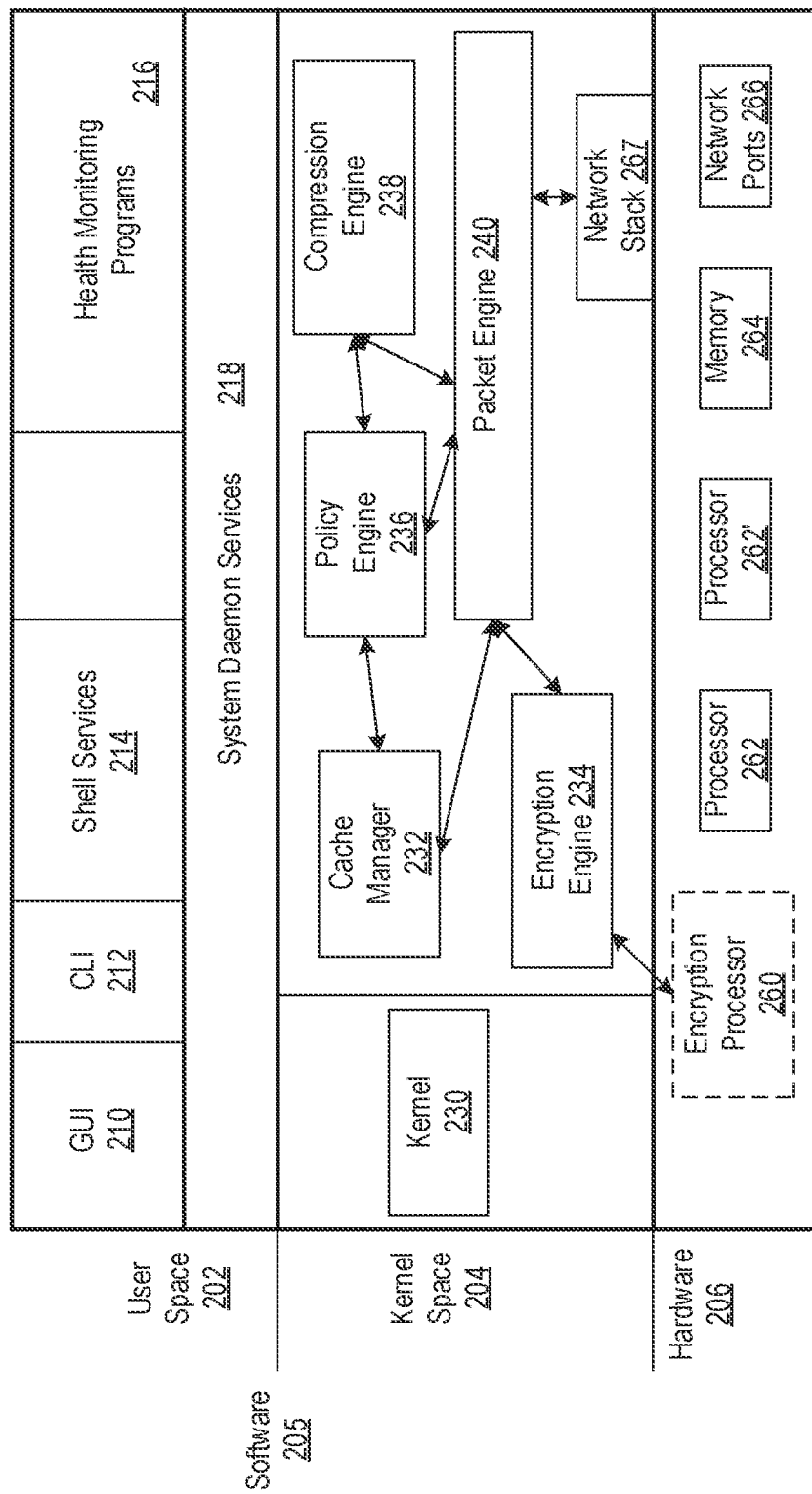
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions, or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to: identify, specify, define or configure caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections; for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network; for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack. The client agent 120 may redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
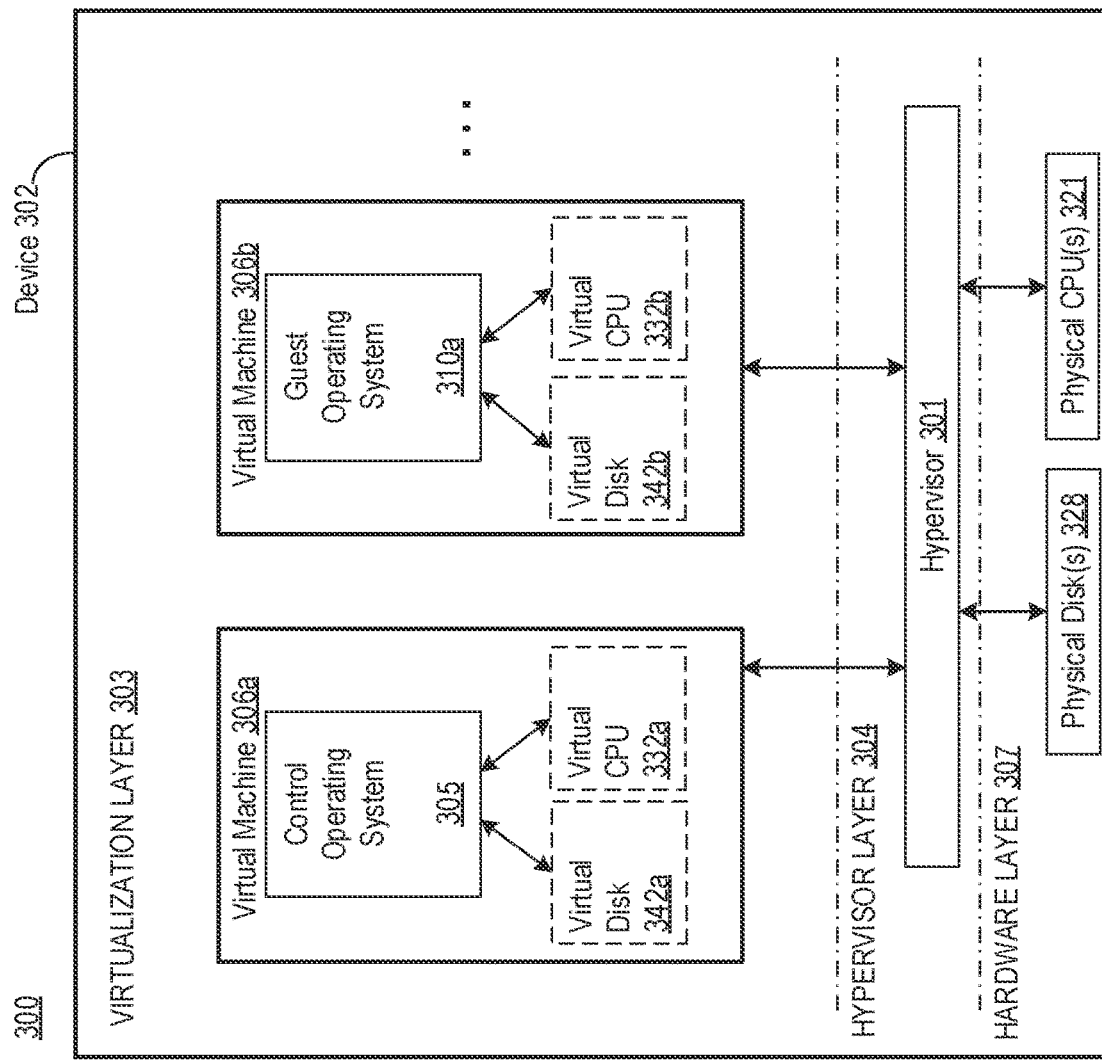
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200 such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold, the load on the associated core is below a predetermined threshold, the load on the associated core is less than the load on the other cores, or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet: for example via a hash table, indirection table, or other mapping technique.

D. Systems and Methods for Providing a Distributed Cluster Architecture

Figure 4:
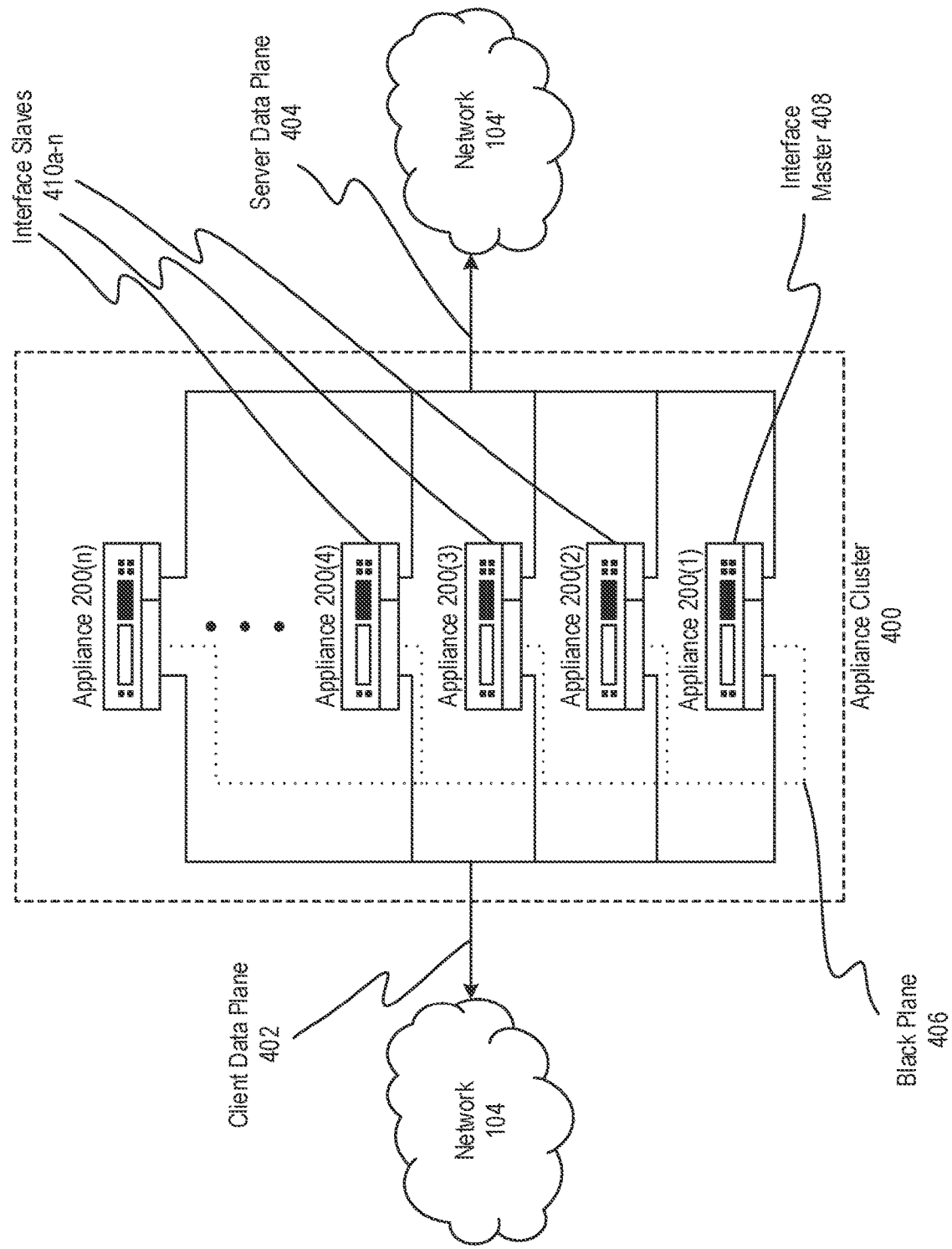
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system with one appliance if the cluster distributing packets to nodes of the cluster and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

E. Systems and Methods for Generating Configuration Profiles for Firewalls

Figure 5:
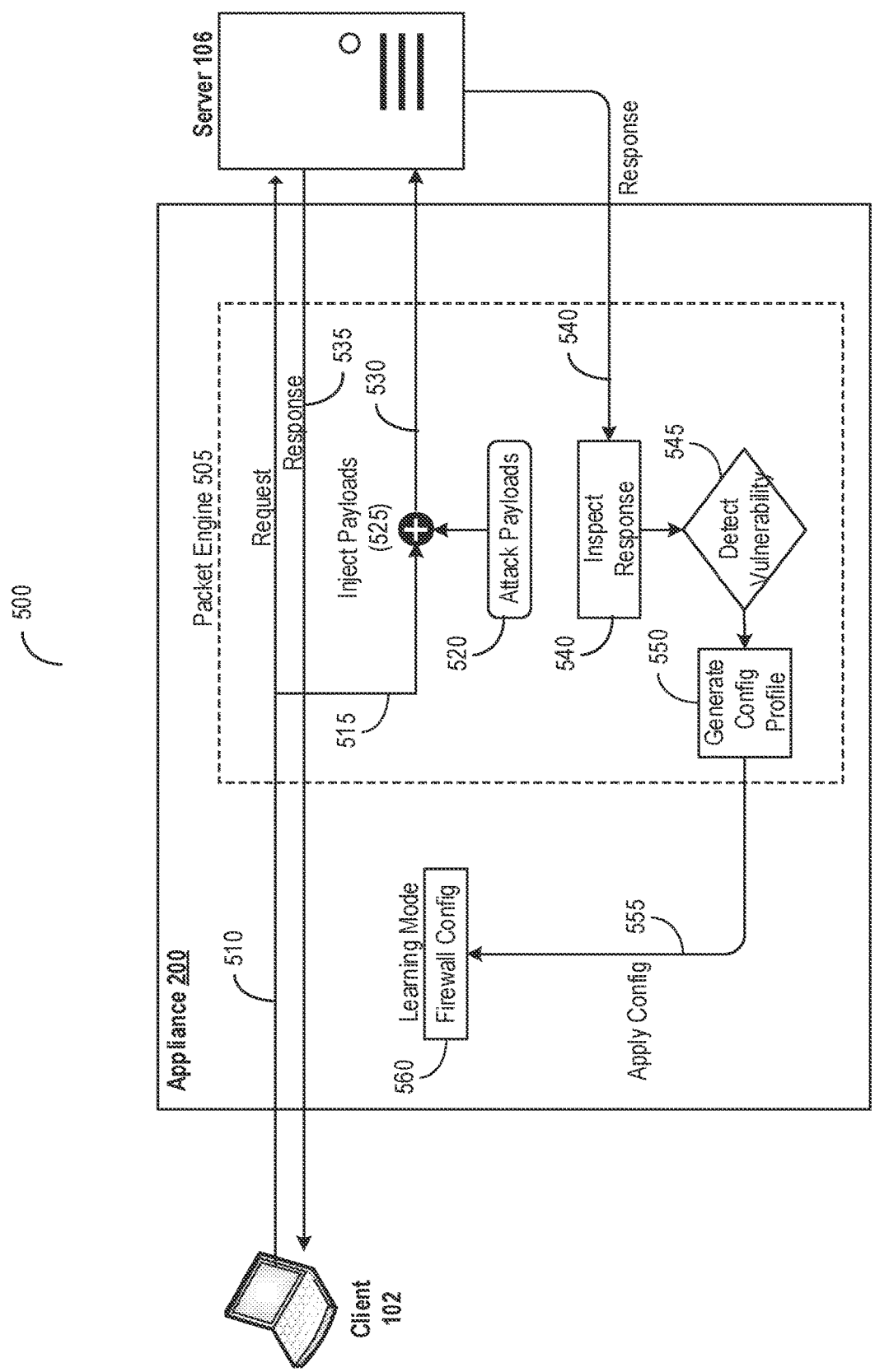
FIG. 5 is a block diagram of an embodiment of an environment for generating configuration profiles for a firewall in accordance with an illustrative embodiment.

Referring now to FIG. 5, depicted is a block diagram of an environment 500 for generating configuration profiles for a firewall. In overview, the system 500 may include at least one client 102, at least one server 106 (sometimes referred herein as a backend server), and at least one appliance 200 deployed between the client 102 and the server 106. The appliance 200 in turn may include at least one packet engine 505 to process communications exchanged between the client 102 and the server 106 via the appliance 200.

As depicted, first the client 102 may send a request to the appliance 200, and the appliance 200 may forward the request onto the server 106 (510). In conjunction, the packet engine 505 on the appliance 200 may intercept the request from the client (515). The packet engine 505 may access and identify one of the attack payloads to inject into the request (520). Each attack payload may be to check for a corresponding vulnerability at the server 106. With the identification, the packet engine 505 may inject an attack payload into the request (525), and forward the request injected with the attack payload to the server 106 (530). The server 106 may return a response to the request without the attack payload to the appliance 200, and the appliance 200 may forward the response to the client 102 (535).

In addition, the server 106 may transmit a response to the request with the attack payload to the appliance 200 (540). Upon receipt, the packet engine 505 may inspect the response (540). From inspecting, the packet engine 505 may determine whether the server 106 is susceptible to a vulnerability corresponding to the attack payload 520 (545). Based on the determination, the packet engine 505 may generate a corresponding configuration profile (550). The configuration profile generated by the packet engine 505 may be applied to firewall configuration settings (555). The firewall configuration settings may be updated and applied while in advanced learning mode (560).

Figure 6:
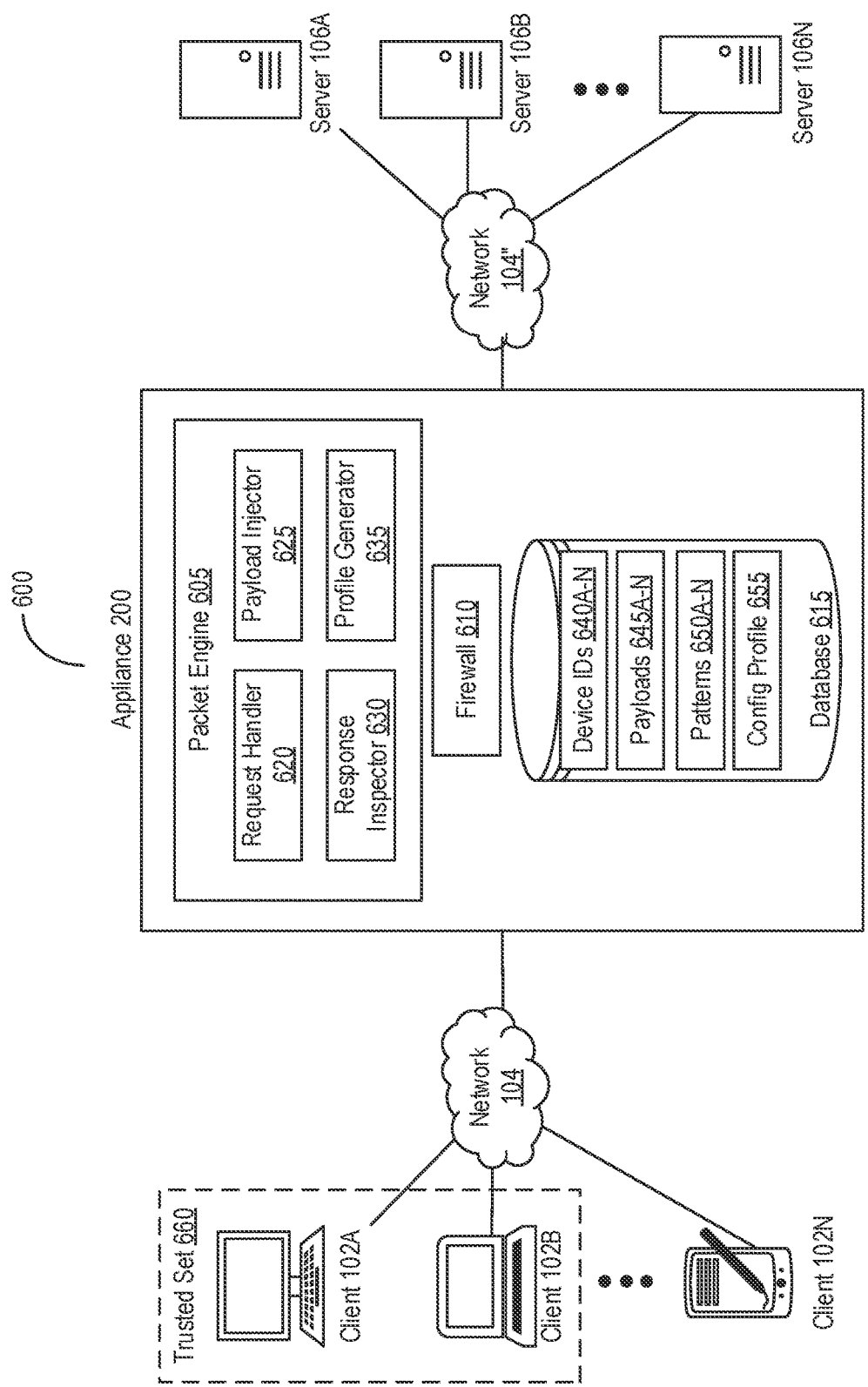
FIG. 6 is a block diagram of an embodiment of a system for generating configuration profiles for firewalls in accordance with an illustrative embodiment.

Referring now to FIG. 6, depicted is a block diagram of a system for generating configuration profiles for firewalls. In overview, the system 600 may include one or more clients 102a—n (hereinafter generally referred to as clients 102), one or more servers 106a—n (hereinafter generally referred to as servers 106), and at least one appliance 200 deployed between the client 102 and the servers 106. The appliance 200 may include at least one packet engine 605, at least one firewall 610, and at least one database 615. The packet engine 605 may include at least one request handler 620, at least one payload injector 625, at least one response inspector 630, and at least one profile generator 635, among others. In some embodiments, the packet engine 605 may also include the firewall 610. In some embodiments, the packet engine 605 may be separated from the firewall 610. The database 615 may include or maintain a set of device identifiers 640A-N (hereinafter generally referred to as device identifiers 640), a set of payloads 645A-N (hereinafter generally referred to as payloads 645), a set of patterns 650A-N (hereinafter generally referred to as patterns 650), and at least one configuration profile 655, among others. At least one of the clients 102 may belong to a trusted set 660 of clients for generation and updating of the configuration profile 655.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the packet engine 605 and the firewall 610 on the appliance 200 may have a testing stage (also referred herein as a staging environment) and a deployment stage (also referred herein as a production environment). Prior to the testing or deployment stages, the firewall 610 may use the initially configured configuration profile 655 (also referred herein as a default or initial configuration profile) to apply to network traffic communicated through the appliance 200. During the testing stage, the packet engine 605 may use the network traffic communicated between a subset or all of the clients 102 and the servers 106 via the appliance 200 in generating the configuration profile 655 for the firewall 610. The firewall 610 may also use another configuration profile (e.g., with default settings) to apply the network traffic between the clients 102 and the servers 106. During the deployment stage, the firewall 610 may apply the configuration profile 655 generated by the packet engine 605 to the network traffic communicated between a subset or all of the clients 102 and the servers 106 via the appliance 200. The network administrator of the appliance 200 may set the packet engine 605 and the firewall 610 to operate in the testing stage or the deployment stage.

In addition, the packet engine 605 may also have a learning mode (also referred herein as an advanced learning mode) and a runtime mode (also referred herein as an evaluation mode). When in the runtime mode, the packet engine 605 may pass through requests and refrain from using the requests to generate or update the configuration profile 655. The administrator of the appliance 200 may set the packet engine 605 to the learning mode or the runtime mode.

Conversely, when in the learning mode, the packet engine 605 may identify requests from a subset or all of clients 102 in generating the configuration profile 605 for the firewall 610. When the learning mode is used in conjunction with the testing stage, the packet engine 605 may use all the requests in generating the configuration profile 655. When the learning mode is used in conjunction with the deployment stage, the packet engine 605 may use requests from one of the subset of clients 605 to generate or update the configuration profile 655 for configuring the firewall 610. The subset of clients 605 may correspond to the trusted set 660.

The trusted set 660 may identify or include one or more clients 102 designated as trusted (e.g., by a network administrator) for requests to be used in generating or updating the configuration profile 655. For instance as depicted, the network administrator may designate clients 102A and 102B as part of the trusted set 660, and designate other clients 102N as excluded from the trusted set 660. The device identifiers 640 on the database 615 may identify clients 102 marked as trusted or not to be trusted. For example, the network administrator can add the device identifiers 640 associated with the clients 102 of the trusted set 660 to the database 615, while excluding clients 102 not of the trusted set 660. Each device identifier 640 may reference or identify a corresponding client 106 and may be marked as trusted or untrusted. The device identifier 640 may be, for example, a unique device identifier, a network address (e.g., internet protocol (IP) address or media access control (MAC) address), or an account identifier associated with the user of the client 102, among others.

Figure 7A:
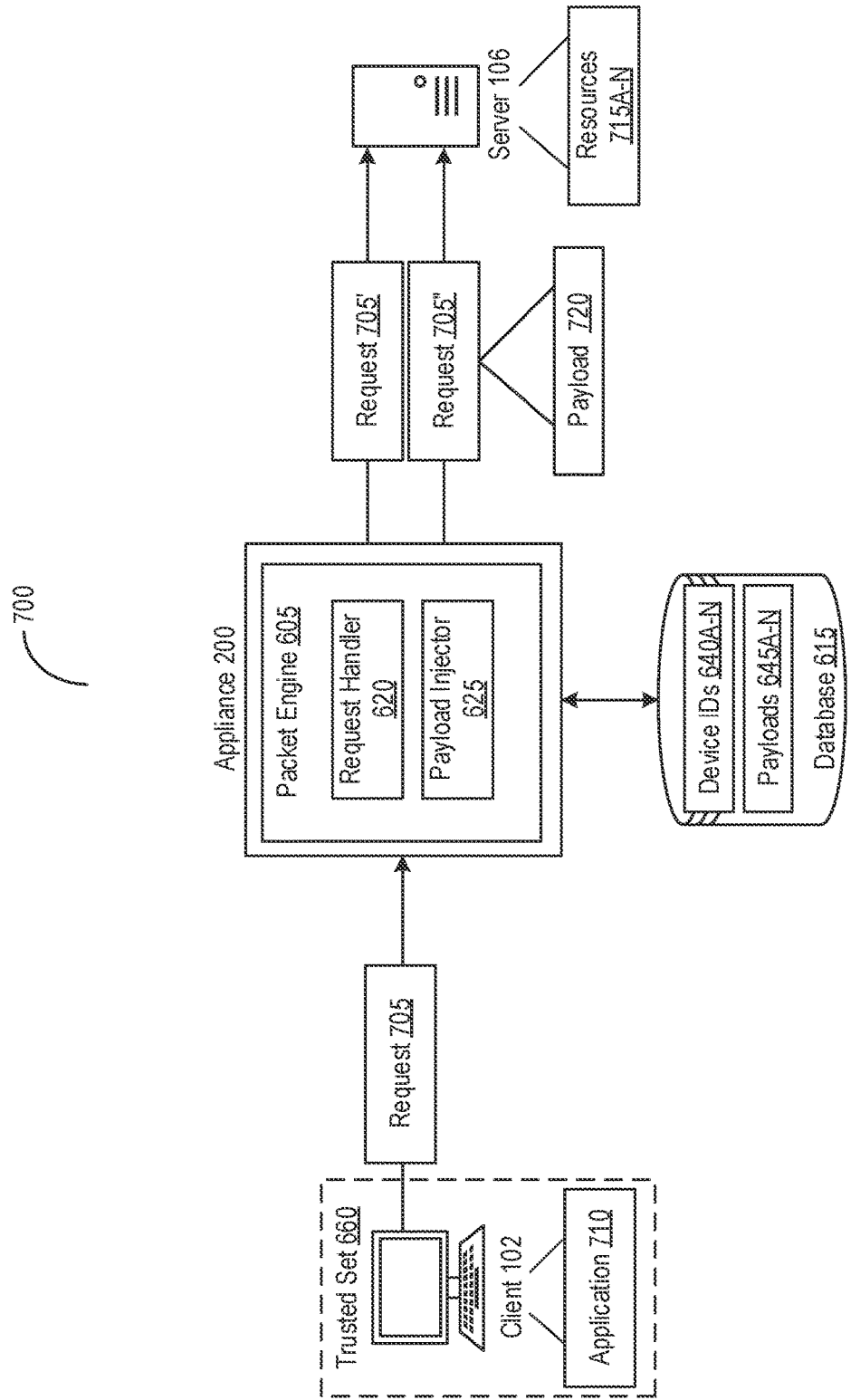
FIG. 7A is a block diagram of an embodiment of a process of injecting payloads into client requests in the system for generating configuration profiles for firewalls in accordance with an illustrative embodiment.

Referring now to FIG. 7A, depicted is a block diagram a process 700 of injecting payloads into client requests in the system 600 for generating configuration profiles for firewalls. The process 700 may include operations performed by the packet engine 605 when in the learning mode and when in the testing stage or deployment stage. As depicted, the client 102 may provide, send, or otherwise transmit a request 705 to the appliance 200. The request 705 may be for the client 102 to access the server 106. In some embodiments, an application 710 executing on the client 102 may generate the request 705 to access one or more resources 715A-N (hereinafter resources 715) hosted on the server 106. The application 710 may include, for example, a web application accessed via a web browser, a standalone application (e.g., a native application), or any other script or executable code that is to access the resources 715 hosted on the server 106. The resource 715 may correspond to one or more processes or data hosted on the server 106 to carry out one or more actions for the application 710 on the client 102. In this context, the request 705 may be for the client 102 to access the resource 715 on the server 106 as part of a function or process carried out by the application 710 on the client 102. In some embodiments, the request 705 may identify or include an identifier corresponding to the client 102. The identifier may include, for example, a unique device identifier, a network address, or the account identifier, among others. The client 102 may belong to the trusted set 660 or may be excluded from the trusted set 660.

The request handler 620 of the packet engine 605 may retrieve, identify, or otherwise receive the request 705 from the client 705. Upon receipt, the request handler 620 may parse the request 705 to extract or identify the identifier. With the identification, the request handler 620 may identify or determine whether the client 102 from which the request 705 is received is of the trusted set 660. In determining, the request handler 620 may compare the identifier from the request 705 to the device identifiers 640 in the database 615. In some embodiments, the request handler 602 may perform the determination when the packet engine 605 is the learning mode for generation or updating of the configuration profile 655.

When the identifier from the request corresponds to one of the device identifiers 640 marked as untrusted, the request handler 620 may determine that the client 102 is not of the trusted set 660. In some embodiments, the request handler 620 may identify the client 102 as not of the trusted set 660, when the identifier does not correspond to any of the device identifiers 640. With the identification, the request handler 620 may determine that the request 705 from the client 102 is not to be trusted in generation or updating of the configuration profile 655. In addition, the request handler 620 may pass or forward the request 705 as request 705' to the server 106, without any additional processing by the packet engine 605.

On the other hand, when the identifier from the request corresponds to one of the device identifiers 640 marked as trusted, the request handler 620 may determine that the client 102 is of the trusted set 660. In some embodiments, the request handler 620 may identify the client 102 as of the trusted set 660, when the identifier corresponds to one of the device identifiers 640 on the database 615. With the identification, the request handler 620 may determine that the request 705 from the request is to be trusted in generation or updating of the configuration profile 655. In addition, the request handler 620 may identify or select the request 705 for additional processing at the packet engine 605, such as by the payload injector 625 as detailed herein below. In some embodiments, the request handler 620 may forward the request 705 as request 705' to the server 106 (e.g., as depicted), while creating another copy of the request 705 as the request 705" for additional processing by the packet engine 605. The selection of the request 705 from the client 102 may be concurrent to not selecting a request from another client 102 identified as not of the trusted set 660.

In conjunction, the payload injector 625 of the packet engine 605 may access the database 615 to retrieve or identify the set of payloads 645. The identification of the set of payloads 645 may be in response to the selection of the request 705. Each payload 645 may identify or include an action type used to check or probe the server 106 (or one of the resources 715 hosted thereon) for a corresponding security vulnerability. The action types may include, for example, buffer overflow action, cookie consistency action, a cross-site scripting (XSS) action, a structured query language (SQL) injection action, a form field consistency action, a cross-site request forgery (CSRF) action, a personally identifiable information (PII) action (e.g., inclusion of credit card number), a field format action, a JavaScript Object Notation (JSON) cross-site scripting action, a JSON SQL injection action, and a JSON denial service action, among others. The set of payloads 645 may be generated and maintained on the database 615. For instance, an administrator of the firewall 610 on the appliance 200 may prepopulate the database 615 with various payloads 645 to test the server 106 for various potential security vulnerabilities.

From the set of payloads 645, the payload injector 625 may select or identify one to include as at least one payload 720 in the request 705". In some embodiments, the payload injector 625 may select the payload 720 based on the action specified in the request 705. To avoid redundant actions, the payload injector 625 may compare the action specified in the request 705 with the action type of the payload 645. When the actions differ, the payload injector 625 may select the payload 645 to include as the payload 720 of the request 705". For example, to avoid redundant actions, the payload injector 625 may select the payload 720 corresponding to the PII action, when the action specified in the request 705 is a XSS action. Otherwise, when the actions are the same, the payload injector 625 may refrain from selecting the payload 645 and identify the next payload 645 in the set. In some embodiments, the payload injector 625 may traverse through the set of payloads 645, and each time a request 705 is received and selected, select a subsequent payload 645 to include as the payload 720 in the request 705".

Upon selection, the payload injector 625 may modify the request 705" to inject, insert, or otherwise include the payload 720. The request 705" may be selected for the modification when the client 102 from which the request 705 is transmitted is identified as of the trusted set 660. In some embodiments, the payload injector 625 may generate the request 705" by including the payload 720 into a copy of the request 705 received from the client 102. In some embodiments, the payload injector 625 may perform the selection of the payload 720 and the inclusion of the payload 720 when the packet engine 605 is the learning mode for generation or updating of the configuration profile 655. With the inclusion, the payload injector 625 may provide, send, or otherwise transmit the request 705" including the payload 720 to the server 106. In some embodiments, the payload injector 625 may include an indicator into the payload 720 that is to be returned in a response from the server 106. The indicator may identify that the response from the server 106 corresponds to the request 705". In some embodiments, the payload injector 625 may store and maintain an identification of the payload 720 included in the request 705".

Figure 7B:
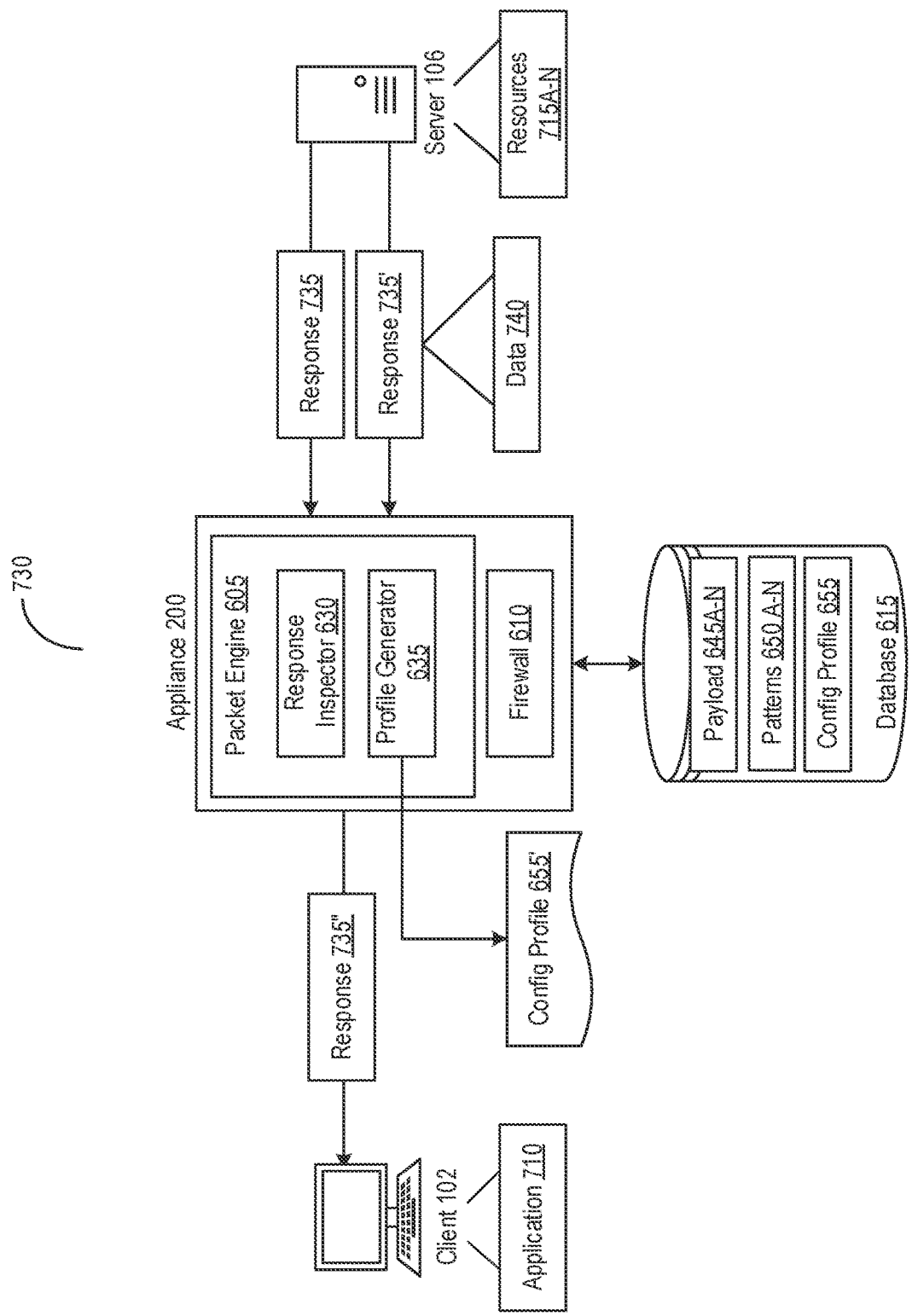
FIG. 7B is a block diagram of an embodiment of a process of inspecting data in server responses in the system for generating configuration profiles for firewalls in accordance with an illustrative embodiment.

Referring now to FIG. 7B, depicted is a block diagram of a process 730 of inspecting data in server responses in the system 600 for generating configuration profiles for firewalls. The process 730 may include operations performed by the packet engine 605 when in the learning mode and when in the testing stage or deployment stage. Continuing on, the server 106 may have received the request 705' and 705" from the appliance 200. The request 705' may be a direct forward of the original request 705 by appliance 200 from the client 102. The request 705" may be a copy of the original request 705 with the inclusion of the payload 720.

Upon receipt, the server 106 may perform the action specified by the request 705' and generate a response 735 to transmit back to the appliance 200. For example, when the request 705' is for a particular webpage, the server 106 may provide the requested webpage along with a cookie in the response 735. In some embodiments, the response 735 may include at least a portion of the information included in the request 705', such as the identifier for the client device 102. Furthermore, the server 106 may perform the action specified by the request 705" and generate a response 735' to transmit back to the appliance. For instance, the request 705" may include the action specified in the request 705'. In addition, the payload 720 of the request 705" may be used to probe the server 106 for cross-site scripting (XSS), and also include an attempt to include content from another website to the requested webpage. The response 735' may include data 740 generated based in accordance with the payload 720 of the request 705". In some embodiments, the response 735" may include at least a portion of the information included in the request 705", such as the identifier for the client device 102.

The response inspector 630 of the packet engine 605 may retrieve, identify, or otherwise receive the responses 735 and 735' from the server 106. With the receipt, the response inspector 630 may determine whether the response 735 or 735' was generated and transmitted in response to the request 705" that included the payload 720 for probing the server 106. In some embodiments, the response inspector 630 may parse the response 735 or 735' to identify the data (e.g., the data 740 in the response 735') included in the response 735 or 735'. Upon identification, the response inspector 630 may identify or determine whether the data corresponds to the action type specified by the payload 720 of the request 705". In some embodiments, the determination may be based on parsing datatypes, fields, values, and other information included in the data of the response 735 or 735'. In some embodiments, the determination may be based on the indication included in the payload 720 of the request 705" to be returned in the response 735 or 735' from the server 106.

When the data is determined to be not correspond to the action type, the response inspector 630 may determine that the response 735 or 735' is not generated and transmitted in response to the request 705" that included the payload 720. In addition, the response inspector 630 may not identify or select the response 735 or 735' for additional processing by the packet engine 605. In the depicted example, the response inspector 630 may determine that the response 735 is generated and transmitted to the request 705" including the payload 720 for probing the server 106 for security vulnerabilities. Instead, the response inspector 630 may forward and pass the response 735 as response 735" to the client 102.

In some embodiments, prior to passing the response 735 as the response 735", the response inspector 630 may determine whether the response 735 is in response to the request 705 from the client 102 of the trusted set 660. The determination may be based on the identifier referencing the client 102 included in the response 735. When the response 735 is determined to be in response to the request 705 of the client 102 from the trusted set 660, the response inspector 630 may forward and pass the response 735 as the response 735" to the client 102, without applying the firewall 610. In contrast, when the response 735 is determined to be in response to the request 705 from the client 102 not of the trusted set 660, the response inspector 630 may apply the firewall 610 prior to passing the response 735 as the response 735" to the client 102. In some embodiments, the response inspector 630 may apply the initial configuration profile 655 to the firewall 610 to determine whether the response 735 is to be permitted or restricted.

Upon determining that the response 735 is in response to the request 705 from the client 102 not belonging to the trusted set 660, the firewall 610 may apply the initial configuration profile 655 to the response 735". The initial configuration profile 655 may define or specify a set of rules for controlling responses from the server 106 through the appliance 200 to the client 102. Each rule may identify a security check for an action type to be controlled (e.g., permitted or restricted) and a counteraction (e.g., allow, remove, or block) when the action type is detected in the response. The set of rules specified by the initial configuration profile 655 may be those assigned (e.g., by the network administrator or the provider of the firewall 610) by default, and may be stricter than the set of rules to be generated by the packet engine 605.

In applying, the firewall 610 may determine whether to permit or restrict forwarding of the response 735 to the client 102 according to the initial configuration profile 655. The firewall 610 may parse the response 735 to extract or identify the data. The firewall 610 may determine whether the data included in the response 735 matches any of the action types identified in security checks of the set of rules of the initial configuration profile 655. If there is a match with one of the rules, the firewall 610 may perform the counteraction specified by the corresponding rule. For example, in accordance with the specifications, the firewall 610 may remove a portion of the data specified by the rule and may forward the response 735 without the portion as the response 735" to the client 102. The firewall 610 may also restrict or block transmission of the entire response 735 when the rule specifies that the counteraction to carry out is to restrict the transmission. The firewall 610 may also provide a notification to the client 102 that the response 735 is restricted. In contrast, if there is no match, the firewall 610 may allow the forwarding or passing of the response 735 as the response 735" to the client 102.

On the other hand, when the data is determined to correspond to the action type, the response inspector 630 may determine that the response 735 or 735' is generated and transmitted in response to the request 705" that includes the payload 720. In addition, the response inspector 630 may identify or select the response 735 or 735' for additional processing by the packet engine 605, such as by the profile generator 635 as detailed herein below. In the depicted example, the response inspector 630 may determine that the response 735' including the data 740 is generated and transmitted to the request 705" including the payload 720 for probing the server 106 for security vulnerabilities. As the response 705" with the payload 720 was generated to test the server 106 for potential security vulnerabilities, the response inspector 630 may not forward or transmit the response 735' to the client 102.

Based on the response 735', the response inspector 630 may identify or determine whether the server 106 is susceptible to the security vulnerability corresponding to the action type included in the payload 720 of the request 705". In some embodiments, the response inspector 630 may perform the determination over an aggregated set of responses 735' determined to be in response to responses 705" with the same payload 270. To determine, the response inspector 630 may identify or select the pattern 650 from the set of patterns 650 that corresponds to the action type of the payload 720 is included in the request 705" to probe the server 106. The set of patterns 650 may correspond to the set of payloads 645 (e.g., in a one-to-one mapping) from which the payload 720 was selected. Each pattern 650 may be defined for a corresponding security vulnerability that is checked for using the payload 720. In some embodiments, each pattern 650 may identify or define a template or regular expression used to determine whether the data 740 indicates that the server 106 is susceptible to the corresponding security vulnerability. The set of patterns 650 may be used to determine whether the server 106 is vulnerable to, for example, buffer overflow, cookie consistency, a cross-site scripting (XSS), a structured query language (SQL) injection, a form field consistency, a cross-site request forgery (CSRF), a personally identifiable information (PII), a field format, a JavaScript Object Notation (JSON) cross-site scripting, a JSON SQL injection, and a JSON denial service, among others.

With the identification, the response inspector 630 may compare the pattern 650 with the data 740 of the response 735' to determine whether the server 106 is susceptible to the security vulnerability corresponding to the action type included in the response 705". In some embodiments, the response inspector 630 may perform the comparison over an aggregated set of responses 735' determined to be in response to responses 705" with the same payload 270. In comparing, the response inspector 630 may parse through the data 740 to compare one or more portions therein. If the pattern 650 is determined to match with at least a portion of the data 740, the response inspector 630 may determine that the server 106 is susceptible to the security vulnerability. For example, the payload 720 of the request 705" may have been sent to the server 106 to probe for the security vulnerability of JSON cross-site scripting, and the server 106 in turn may return with the response 735'. In this example, the response inspector 630 may check the data 740 against the pattern 650, and may determine that the server 106 is susceptible to JSON cross-site scripting when the pattern 650 matches with at least a portion of the data 740. Otherwise, if the pattern 650 is determined to not match with any portion of the data 740, the response inspector 630 may determine that the server 106 is not susceptible to the security vulnerability.

The profile generator 635 of the packet engine 605 may generate at least one configuration profile 655' based on the determination of whether the server 106 is susceptible to the security vulnerability. In some embodiments, the packet engine 605 may update the initial configuration profile 655 to generate the new configuration profile 655'. In some embodiments, the profile generator 635 may perform the generation of the configuration profile 655' when the packet engine 605 is the learning mode for generation or updating of the configuration profile 655. The configuration profile 655' may define or specify a set of rules for controlling responses from the server 106 through the appliance 200 to the client 102. Each rule may identify a security check for an action type to be controlled (e.g., permitted or restricted) and a counteraction (e.g., allow, remove, or block) when the action type is detected in the response. The configuration profile 655' may differ from the initial configuration profile 655 in that the configuration profile 655' is generated using responses from the server 106 in response to requests including payloads to probe the server 106 for various security vulnerabilities.

When the server 106 is determined to be susceptible to the security vulnerability, the profile generator 635 may generate the configuration profile 655' to restrict requests of the corresponding action type. In some embodiments, the profile generator 635 may enable the security check for the action type to be controlled and the counteraction when the action type is detected in the response. In contrast, when the server 106 is determined to be not susceptible to the security vulnerability, the profile generator 635 may generate the configuration profile 655' to permit requests of the corresponding action type. In some embodiments, the profile generator 635 may disable the security check for the action type to be controlled and the counteraction when the action type is detected in the response. In some embodiments, the profile generator 635 may enable the security check for the action type and the counteraction, at a different level of security check and a different level of the counteraction. In some embodiments, the configuration profile 655' may be generated or derived in accordance with the following security checks and the counteractions for the corresponding security checks:

| Security Check | Security Check Options | Counteraction for Security Check |
| --- | --- | --- |
| BufferOverflow | BufferOverflowAction: block log stats<br>BufferOverflowMaxCookieLength: 4096<br>BufferOverflowMaxHeaderLength: 4096<br>BufferOverflowMaxURLLength: 1024<br>BufferOverflowMaxQueryLength: 1024<br>BufferOverflowMaxTotalHeaderLength: 24820 | Track of lengths of<br>URL<br>Query<br>Cookie<br>Header<br>Enable the action always. |
| Cookie consistency | CookieConsistencyAction: block learn log stats | If there are any cookies in the response, we should enable cookie consistency check. |
| XSS | CrossSiteScriptingAction: block learn log stats | Inject XSS attack patterns in the forms, headers, cookies and monitors response for XSS vulnerabilities. |
| SQL | SQLInjection Action: block learn log stats | Inject SQL attack patterns in the forms, headers, cookies and monitors response for SQL vulnerabilities.<br>If SQL database is detected, enable the check. |
| Form Field Consistency | FieldConsistencyAction: block learn log stats | If any forms are detected, enable field consistency check. |
| CSRF Form Tagging | CSRFtag Action: block learn log stats | If any forms are detected, enable field consistency check. |
| CreditCard | CreditCardAction: none<br>CreditCard: visa mastercard discover amexjcb dinersclub<br>CreditCardMaxAllowed: 0<br>CreditCardXOut: OFF | Monitor every response payload for credit card patterns (visa, mastercard, discover, amex, jcb, dinersclub). If there are any such patterns found, we should enable credit card protection check. |
| FieldFormat | FieldFormatAction: block learn log stats<br>DefaultFieldFormatType: ""<br>DefaultFieldFormatMinLength: 0<br>DefaultFieldFormatMaxLength: 65535 | Monitor every form control in the response forms for "minlength", "maxlength" and html5 "type" attributes. Use this information for enabling field format security check with additional enforcement rules.<br>html 5 has new form input tag ("integer", "email", "url", "tel") support.<br>Sample html form fields:<br><input type = "number" min = "0" step = "1"/><br><input type = "text" pattern = "\d*"/><br><input type = "text" minlength = "5" id = "fruit"><br><input type = "text" maxlength = "100" id = "fruit"> |
| JSON XSS | JSON Cross-Site Scripting: block learn log stats | Inject XSS attack patterns in the REST API Calls (content type of the payload are 'application/json') and monitor responses for JSON SQL vulnerabilities. |
| JSON SQL | JSON SQL Injection: block learn log stats | Inject SQL attack patterns in the REST API Calls (content type of the payload are 'application/json') and monitors response for XSS vulnerabilities.<br>If SQL database is detected, enable the check. |
| JSON Denial of Service | JSONDoSAction: block log stats<br>JSONMaxDocumentLengthCheck: ON<br>JSONMaxDocumentLength: 20000000<br>JSONMaxContainerDepthCheck: ON<br>JSONMaxContainerDepth: 5<br>JSONMaxObjectKeyCountCheck: ON<br>JSONMaxObjectKeyCount: 10000<br>JSONMaxObjectKeyLengthCheck: ON<br>JSONMaxObjectKeyLength: 128<br>JSONMaxArrayLengthCheck: ON<br>JSONMaxArrayLength: 10000<br>JSONMaxStringLengthCheck: ON<br>JSONMaxStringLength: 1000000 | From the traffic, infer the following:<br>MaxContainerDepth<br>MaxObjectKeyCount<br>MaxObjectKeyLength<br>MaxDocumentLength<br>MaxArrayLength<br>MaxStringLength |

In some embodiments, the profile generator 635 may determine or identify a level of security check or a level of counteraction for the security vulnerability corresponding to at least one of the rules in the configuration profile 655'. The level of security check may be used to configure a degree of strictness of the security check in the rule of the configuration profile 655'. The level of counteraction may be used to configure a degree of strictness of the counteraction to be performed when the action type is detected as specified in the configuration profile 655'. The identification may be based on the response 735' or the aggregated set of responses 735' determined to be in response to responses 705" with the same payload 270. The identification may be performed when the server 106 is determined to be susceptible or not susceptible to the security vulnerability.

To identify the levels, the profile generator 635 may compare the data 740 of the response 735' (or aggregated set of responses 735') against the corresponding pattern 650. Based on the comparison, the profile generator 635 may determine a degree of tolerance between the corresponding portion of data 740 and the pattern 650. The level of tolerance may indicate or correspond to an amount of difference from the data 740 matching the pattern 650. For example, the pattern 650 may be used to test whether the server 106 is susceptible to buffer overflow, and may specify a maximum URL length of 1024 bits. Since the lengths of URLs included in the data 740 are 256, the data 740 may be determined to not match the pattern 650 and the degree of difference may be determined to be 768 (1024–256).

Based on the degree of tolerance, the profile generator 635 may set, identify, or otherwise determine the level of security check or the level of counteraction for the corresponding rule in the configuration profile 655'. The profile generator 635 may set the level of security check or the level of counteraction corresponding (e.g., proportionate or commensurate) to the degree of tolerance. Using the level of security check or the level of counteraction, the profile generator 635 may generate, set, or otherwise modify the configuration profile 655'. In modifying, the profile generator 635 may adjust (e.g., increase or decrease) the degree of strictness of the security check and the counteraction of the corresponding rule in the configuration profile 655'. Continuing from the previous example, the profile generator 635 may decrease the maximum URL length specified by the security check of the rule in the configuration profile 655' from 1024 to 256. The profile generator 635 may also set the counteraction specified in the configuration profile 655' from blocking to removing the URLs from responses from the server 106.

Upon generation, the profile generator 635 may apply the new or updated configuration profile 655' to the firewall 610. The set of rules defined by the configuration profile 655' may be less strict than the original set of rules in the initial configuration profile 655, thereby reducing computing resource consumed by the firewall 610 in processing responses. By applying the configuration profile 655', the firewall 610 may control (e.g., permit or restrict) responses that include the corresponding action type. The profile generator 635 may also replace the initial configuration profile 655 with the new configuration profile 655' when applying to the firewall 610. In some embodiments, the profile generator 635 send, transmit, or otherwise provide information for presentation or display identifying or including the configuration profile 655' for the firewall 610. For example, the profile generator 635 may provide the information for display on a user interface as a recommendation to an administrator of the appliance 200 (or the network 104'). The profile generator 635 may identify or receive an indication (e.g., from the administrator) that the configuration profile 655' is to be applied. With the receipt, the profile generator 635 may apply the configuration profile 655' to the firewall 610.

Figure 7C:
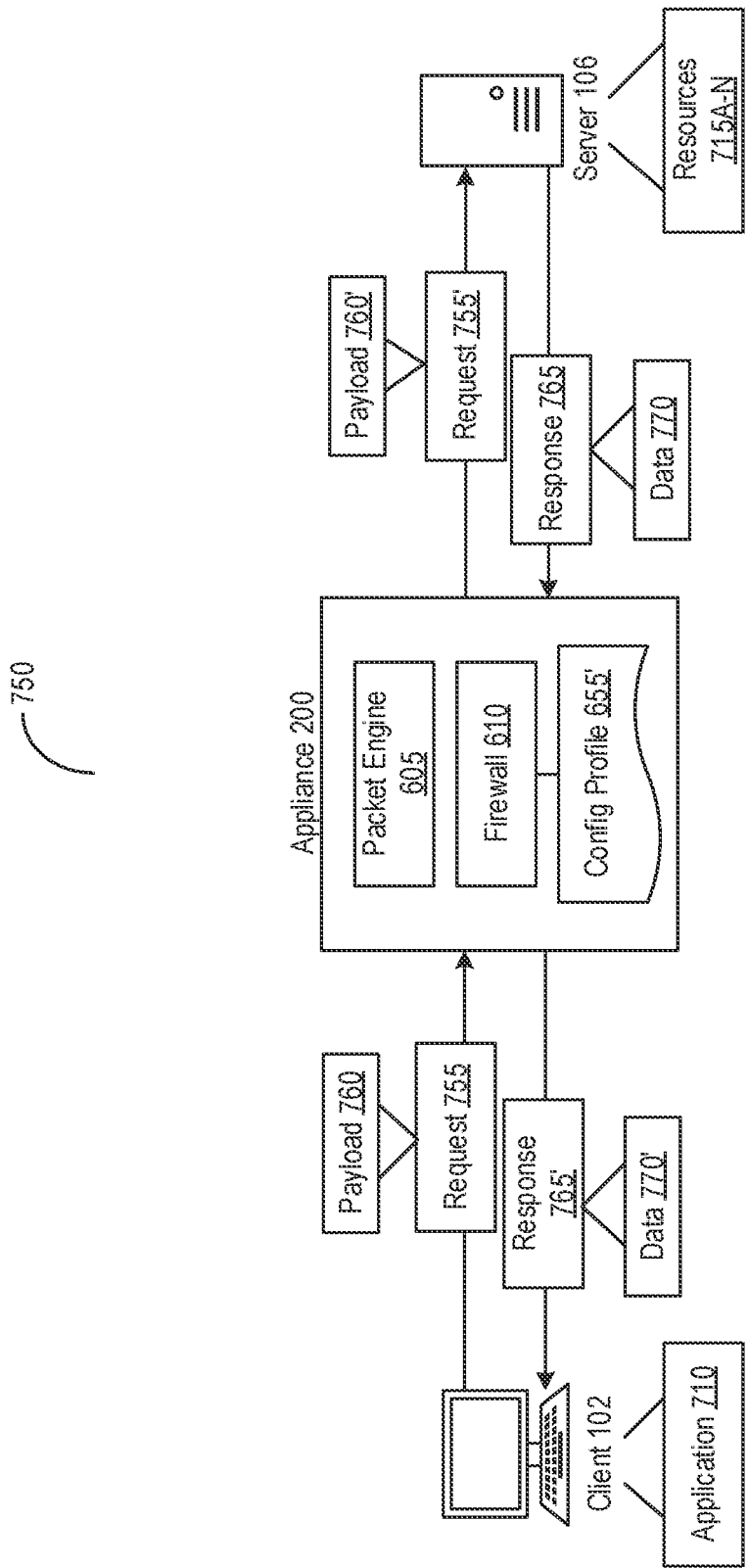
FIG. 7C is a block diagram of an embodiment of a process of updating firewalls while applying to in accordance with configuration profiles in the system for generating configuration profiles for firewalls in accordance with an illustrative embodiment.

Referring now to FIG. 7C, depicted is a block diagram of a process 750 of applying firewalls to in accordance with configuration profiles in the system 600 for generating configuration profiles for firewalls. The process 750 may include operations performed by the appliance 200 when the packet engine 605 is in the runtime mode and when in the deployment stage. The process 750 may be performed subsequent to the generation of the configuration profile 655'. As depicted, the client 102 may transmit a request 755 to the appliance 200. The request 755 may be generated in a similar manner as the request 705 discussed above, and may include a payload 760. The payload 760 of the request 755 may be to access one of the resources 715 on the server 106 as part of a function or process carried by the application 710 on the client 102. In turn, the appliance 200 may receive the request 755 from the client 102, and may forward as request 755' including a payload 760' to the server 106. Upon receipt, the server 106 may perform the action specified by the payload 760' of the request 755', and may generate a response 765 including data 770 to transmit back to the appliance 200.

When received, the firewall 610 on the appliance 200 may permit, restrict, or otherwise control the response 765 in accordance with the configuration profile 655'. The configuration profile 655' may have been generated by the packet engine 605 as discussed above. In applying, the firewall 610 may determine whether to permit or restrict forwarding of the response 765 to the client 102 according to the initial configuration profile 655. The firewall 610 may parse the response 765 to extract or identify the data 770. The firewall 610 may determine whether the data 770 included in the response 765 matches any of the action types identified in security checks of the set of rules of the configuration profile 655'.

If there is a match with one of the rules, the firewall 610 may perform the counteraction specified by the corresponding rule. When the counteraction specifies removal or modification, the firewall 610 may generate the response 765'. The response 765' may include data 770' generated by removing the portion of data 770 determined to match. When the counteraction specifies restriction, the firewall 610 may block transmission of the response 765 to the client 102. The firewall 610 may also provide a notification to the client 102 that the response 765 to the request 755 is restricted. In contrast, if there is no match, the firewall 610 may allow the forwarding or passing of the response 765 as the response 765' including the data 770' to the client 102.

Figure 7D:
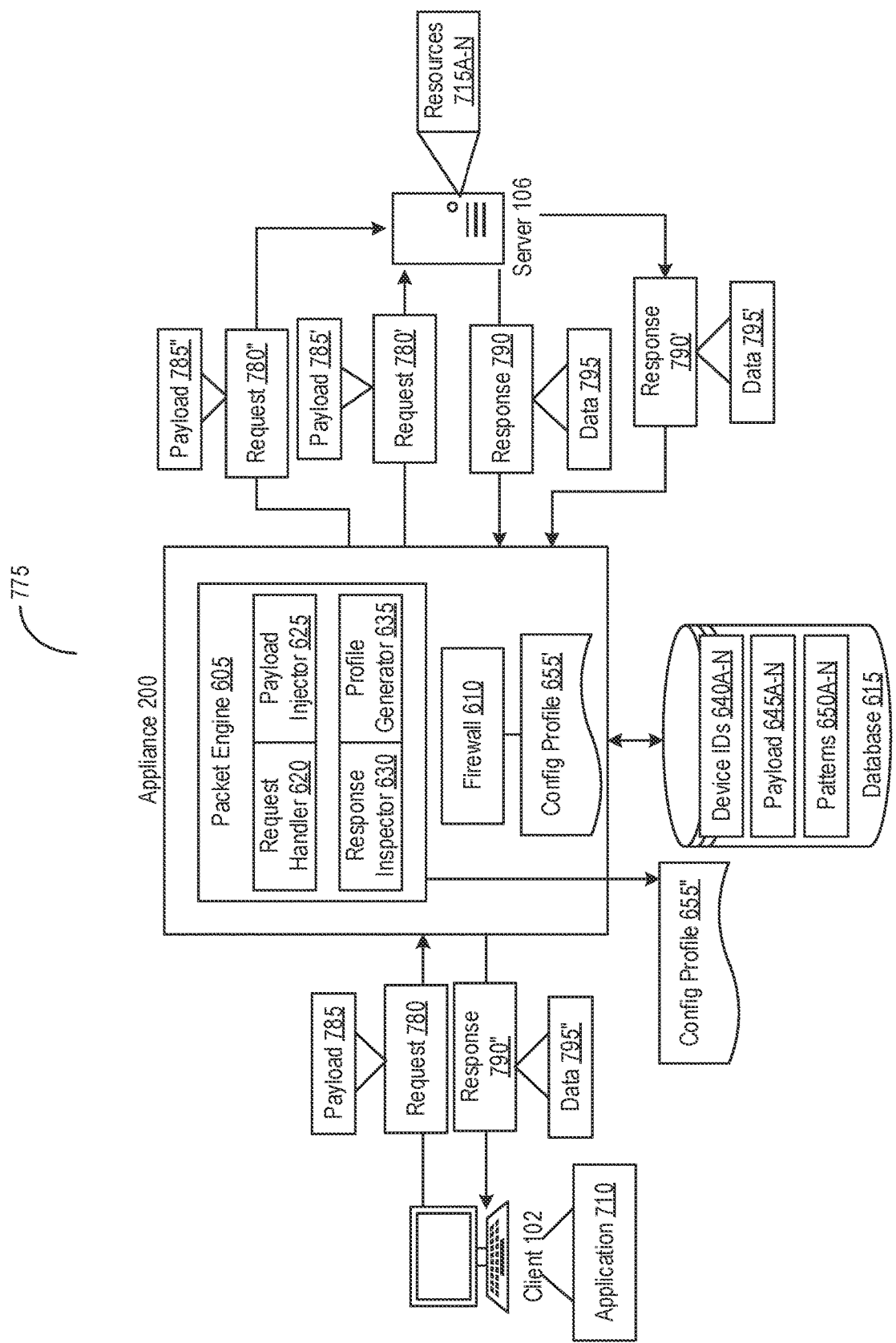
FIG. 7D is a block diagram of an embodiment of a process of applying, in accordance with configuration, profiles in the system for generating configuration profiles for firewalls in accordance with an illustrative embodiment.

Referring now to FIG. 7D, depicted is a block diagram of a process 775 of applying firewalls to in accordance with configuration profiles in the system 600 for generating configuration profiles for firewalls. The process 775 may include operations performed by the appliance 200 when the packet engine 605 is in learning mode and when in deployment stage, and may overlap with the operations discussed above in conjunction with processes 700 and 730. The process 775 may be performed subsequent to the generation of the configuration profile 655'. As depicted, the client 102 may transmit a request 780 to the appliance 200. The request 780 may be generated in a similar manner as the request 705 discussed above, and may include a payload 785. The payload 785 of the request 780 may be to access one of the resources 715 on the server 106 as part of an action carried by the application 710 on the client 102. The payload 780 may also identify or include an identifier corresponding to the client 102. In turn, the appliance 200 may receive the request 780 from the client 102. The appliance 200 (including the packet engine 605 and the firewall 610) may perform the same operations as discussed above with respect to the request 705.

Upon receipt, the request handler 620 may determine whether the client 102 from which the request 780 is received is of the trusted set 660 (e.g., using the device identifier 640). When the request 780 is determined to be from the client 102 that does not belong to the trusted set 660, the request handler 620 may not select the request 780 for additional processing by the packet engine 605, and may forward the request 780 as request 780' including payload 785' to the server 106. On the other hand, when the request 780 is determined to be from the client 102 that belongs to the trusted set 660, the request handler 620 may select the request 780 for additional processing using a copy of the request 780 as request 780". The request 780" may include a payload 785" that includes at least a portion of the payload 785 of the original request 780. The request handler 620 may also forward the request 780 as the request 780' including the payload 785' to the server 106.

The payload injector 625 may select or identify one of set of payloads 645 to include as the payload 785" into the request 780". In some embodiments, the payload injector 625 may identify a payload 645 that was previously not selected to include in the payload 720 of the request 705 for probing the server 106. The payload 645 may test for another security vulnerability at the server 106 that was not previously probed for with the payload 720 of the request 705. Upon selection, the payload injector 625 may modify the request 780" to inject, insert, or otherwise include the payload 645 as part of the payload 785". With the inclusion, the payload injector 625 may transmit the request 780" including the payload 785" to the server 106. The server 106 may in turn receive the requests 780' and 780" from the appliance 200, and may perform similar functions as discussed above with respect to requests 705' and 705". Upon receipt, the server 106 may perform the action specified by the payload 785' of the request 780' and generate a response 790 including data 795 to transmit back to the appliance 200. In addition, the server 106 may perform the action specified by the payload 785" of the request 785" and generate a response 795' including the data 795' to transmit back to the appliance 200.

Upon receipt, the response inspector 630 may receive the responses 790 and 790' from the server 106. With the receipt, the response inspector 630 may determine whether the response 790 or 790' was generated and transmitted in response to the request 705" that included the payload 785" for probing the server 106. When the response 790 or 790' is determined to be not in response to the request 780" that included the payload 785", the response inspector 630 may not select the response 790 or 790' for additional processing by the packet engine 605. In the depicted example, the response inspector 630 may determine the response 790 as not in response to the request 780" and may refrain from selecting the response 790. The firewall 610 may apply the configuration profile 655' to determine whether permit, restrict, or otherwise control transmission of the response 790 to the client 102. The application of the configuration profile 655' may be similar to the application as described above with respect to the response 735 or 765. Depending on the application, the firewall 610 may forward the response 790 as response 790'" to the server 106. The response 790'" may include data 795'" that corresponds to the data 795 of the original response 790.

In contrast, when the response 790 or 790' is determined to be in response to the request 780" that included the payload 785" for probing the server 106, the response inspector 630 may select the response 790 or 790' for additional processing by the packet engine 605. In the depicted example, the response inspector 630 may determine the response 790' as in response to the request 780", and may select the response 790' for additional processing. Using the response 790', the response inspector 630 may determine whether the server 106 is susceptible to the security vulnerability probe for using the payload 785" of the request 780". Then determination may be similar as discussed above, and may be performed using the set of patterns 650 maintained on the database 615.

The profile generator 635 may change, modify, or otherwise update the configuration profile 655' to generate a new configuration profile 655". The configuration profile 655" may define or include a set of rules for controlling responses from the server 106. The set of rules in the configuration profile 655" may differ from the previous configuration profile 655', depending on whether new security vulnerabilities are found at the server 106. In some embodiments, the profile generator 635 may update the configuration profile 655' based on the determination of whether the server 106 is susceptible to the security vulnerability probe for using the payload 785" of the request 780". The updating of the configuration profile 655' may be similar to the updating of the configuration profile 655 as discussed above. In some embodiments, the profile generator 635 may again provide information providing the configuration profile 655" (e.g., to an administrator of the appliance 200).

In some embodiments, the profile generator 635 may update the configuration profile 655' based on the application of the configuration profile 655' by the firewall 610 to responses (e.g., the response 790) from the server 106. The firewall 610 may apply the configuration profile 655' to the response 790" prior to transmission to the client 102. From applying, the firewall 610 may determine whether the response 790 corresponding to the response 790" is to be restricted in accordance with the configuration profile 655'. For example, the response 790" may contain data 795" that includes the action type matching one of the security checks specified by the configuration profile 655'.

Based on the determination that the response 790 is to be restricted, the profile generator 635 may determine or identify a level of violation of the second response. The level of violation may correspond to an amount of deviation of the data 795 from non-compliance with the rule specified by the configuration profile 655'. For example, the profile generator 635 may determine that a length of the field format in the data 795 in the response 790 is greater than the maximum allowable length for the field as defined by the configuration profile 655'. Using the level of violation, the profile generator 635 may update or modify the configuration profile 655' to generate the configuration profile 655". In some embodiments, the profile generator 635 may set, identify, or otherwise determine the level of security check or the level of counteraction for the corresponding rule in the configuration profile 655' in accordance with the level of violation. The profile generator 635 may set the level of security check or the level of counteraction corresponding (e.g., proportionate or commensurate) to the degree of violation. Continuing with the previous example, the profile generator 635 may set the maximum allowable length in the configuration profile 655" to the newly identified length for the field.

In this manner, the packet engine 605 may automatically generate configuration profiles 655 for the firewall 610 to address the security vulnerabilities that the server 106 is determined to be susceptible. The generation of the configuration profile 655 may be performed with little to no involvement by the administrator of the appliance 200, thereby eliminating or reducing the burden to the administrator. Furthermore, as the configuration profile 655 may be successively updated and modified using a subset of responses from the server 106, the packet engine 605 may allow network traffic to flow through the appliance 200 in any stage. In addition, the relaxed set of rules provided by the configuration profile 655 may reduce consumption of computing resources and network bandwidth at the appliance 200, thereby improving the overall performance of the system 600.

Figure 8:
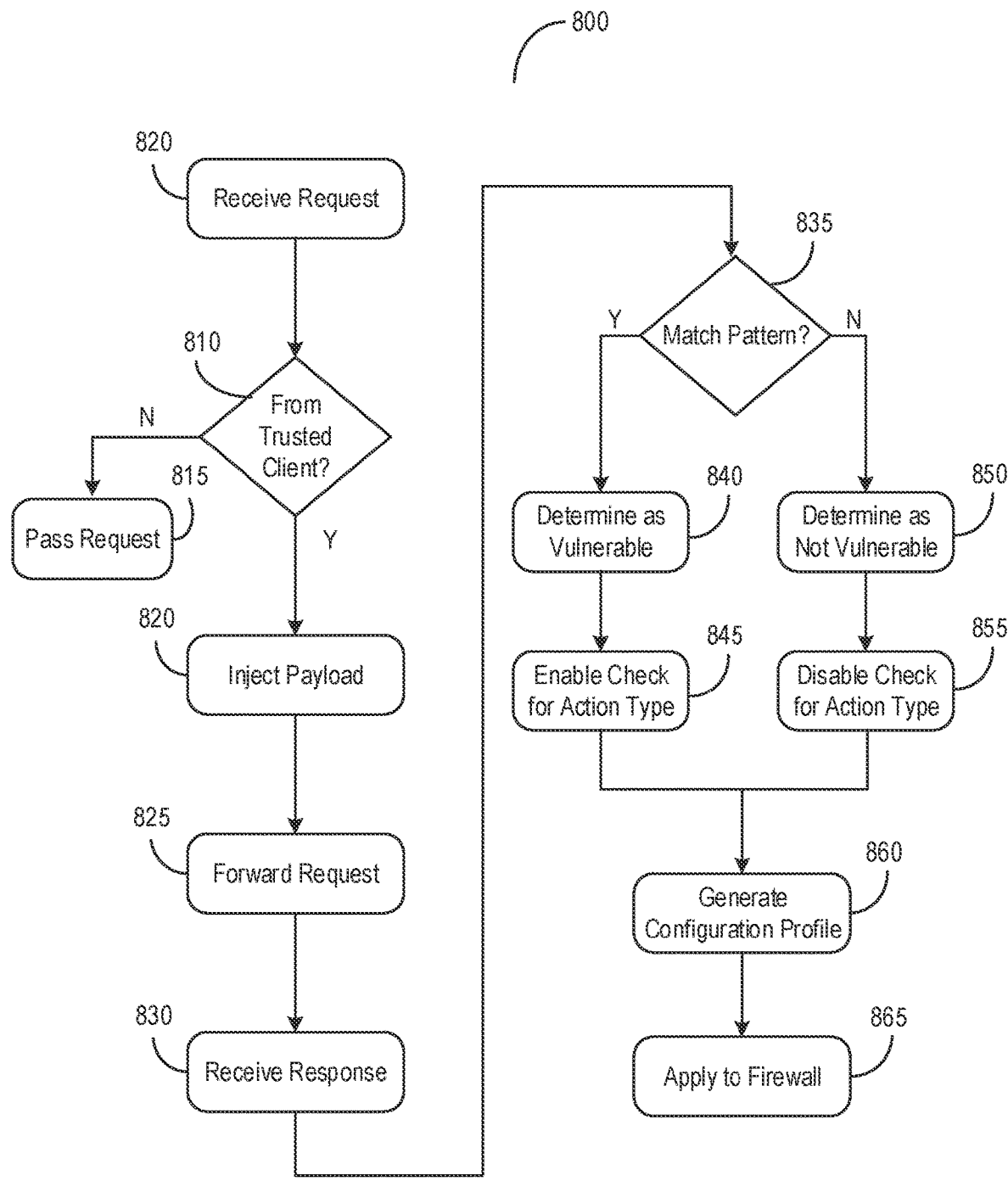
FIG. 8 is a flow diagram of an embodiment of a method for generating configuration profiles for firewalls in accordance with an illustrative embodiment.

FIG. 8 is a flow diagram of an embodiment of a method 800 for generating configuration profiles for firewalls. The functionalities of method 600 may be implemented using, or performed by, the components described in FIGS. 1-7D, such as the packet engine 605 and firewall 610 executing on the appliance 200. In brief overview, a packet engine may receive a request from a client (805). The packet engine may determine whether the request is from a trusted client (810). If the request is determined to be not from the trusted client, the packet engine may pass the request (815). Otherwise, if the request is determined to be from the trusted client, the packet engine may inject a payload into the request (820). The packet engine may forward the request to a server (825). The packet engine may receive a response from the server (830). The packet engine may determine whether the response matches a pattern (835). When the response matches the pattern, the packet engine may determine as vulnerable (840). The packet engine may enable a check for an action type (845). When the response does not match the pattern, the packet engine may determine as not vulnerable (850). The packet engine may disable the check for the action type (855). The packet engine may generate a configuration profile (860). The packet engine may apply to a firewall (865).

In further detail, a packet engine (e.g., the packet engine 605) may receive a request (e.g., the request 705) from a client (e.g., the client 102) (805). The request may be for an application (e.g., the application 710) on the client to access a resource (e.g., the resource 715) hosted on a server (e.g., the server 106). The packet engine may identify or otherwise determine whether the request is from a trusted client (810). The packet engine may compare an identifier in the request with a list of device identifiers (e.g., the device identifiers 640) for trusted clients. When the identifier is found on the list, the packet engine may determine that the request is from the trusted client, and may select the request for additional processing. Otherwise, the packet engine may determine that the request is not from the trusted client. If the request is determined to be not from the trusted client, the packet engine may pass the request to the server (815).

Otherwise, if the request is determined to be from the trusted client, the packet engine may insert, include, or otherwise inject a payload (e.g., the payload 720) into the request (820). The payload may be selected from a set of payloads (e.g., the payloads 645). Each payload may include or identify an action type to test or probe the server for a corresponding security vulnerability. The packet engine may transmit, send, or otherwise forward the request to the server (825). Upon insertion of the payload into the request, the packet engine may transmit the request to the server. The server in turn may perform the action specified by the payload, as well as the remainder of the request, and may generate a response (e.g., the response 735') including data (e.g., the data 740) to transmit to the packet engine.

The packet engine may identify, retrieve, or otherwise receive the response from the server (830). With receipt, the packet engine may parse the response to identify the data included therein. The packet engine may determine whether the response matches a pattern (e.g., the pattern 650) (835). Each pattern may correspond to one of the payloads, and may be used to determine whether server is susceptible to the security vulnerability tested by the respective payload. When the response matches the pattern, the packet engine may determine the server as vulnerable (840). The server may be determined as vulnerable to the security vulnerability probed for using the injected payload of the request. The packet engine may enable a check for the action type (845). The security check may be to apply to responses that include data corresponding to the respective action type from the server. When the response does not match the pattern, the packet engine may determine as not vulnerable (850). The server may be determined as not vulnerable to the security vulnerability probed for using the injected payload of the request. The packet engine may disable the check for the action type (855).

The packet engine may generate a configuration profile (e.g., the configuration profile 655) (860). The packet engine may generate or update the configuration profile to include the enabled security checks and exclude the disabled security checks. The configuration profile may define or include a set of rules. Each rule may identify a corresponding security check for the action type and a counteraction to be performed. The packet engine may apply the configuration profile to a firewall (e.g., the firewall 610) (865). The packet engine may provide the configuration profile for display to an administrator as a recommendation. Upon selection, the firewall may use the configuration profile to permit or restrict responses from the server.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of generating a configuration profile for a firewall, comprising:
    modifying, by a device that is intermediary between a plurality of clients and a server, a request from a client of the plurality of clients to access the server to include a payload provided by the device, the payload comprising an action type selected from a plurality of action types used to probe the server for a corresponding security vulnerability of a plurality of security vulnerabilities;
    transmitting, by the device to the server, the request including the payload to cause the server to provide a response to the device;
    determining, by the device, that the server is susceptible to a security vulnerability of the plurality of security vulnerabilities corresponding to the action type based at least on the response; and
    generating, by the device, the configuration profile for the firewall to restrict requests of the action type to access the server from the plurality of clients;
    wherein modifying the request to access further comprises modifying, in response to setting the device to a mode for generation of the configuration profile using requests from a subset of the plurality of clients, the request from the client to access the server to include the payload.

2. The method of claim 1, further comprising:
    determining, by the device, that the server is not susceptible to a second vulnerability of the plurality of security vulnerabilities corresponding to a second action type of the plurality of action types based at least on a second response to a second request including a second payload comprising the second action type; and
    generating, by the device, a second configuration profile for the firewall to permit requests of the second action type to access the server from the plurality of clients.

3. The method of claim 1, further comprising:
    determining, by the device, that a second response from a server is to be restricted in accordance with the configuration profile for the firewall;
    identifying, by the device based at least on the determination that the second response is to be restricted, a level of violation of the second response; and
    modifying, by the device, the configuration profile using the level of violation determined for the second response.

4. The method of claim 1, further comprising identifying, by the device responsive to determining that the server is susceptible to the security vulnerability, at least one of a level of security check or a level of counteraction for the security vulnerability based at least on the response, and
    wherein generating the configuration profile further comprises generating the configuration profile for the firewall in accordance with at least one of the level of security check or the level of counteraction.

5. The method of claim 1, further comprising:
    identifying, by the device from the plurality of clients, the client as trusted for generation of the configuration profile and a second client as not trusted; and
    selecting, by the device, the request to access the server from the client identified as a trusted client and modifying the request to include the payload, concurrent with not selecting a second request to access the server from the second client not identified as a trusted client.

6. The method of claim 1, further comprising:
    determining, by the device, that a second response from the server is transmitted in response to a second request from a second client device of the plurality of clients, the second client device not identified as a trusted client device; and
    applying, by the device, a default configuration profile of the firewall to determine whether to permit or restrict the second response from the server.

7. The method of claim 1, wherein determining that the server is susceptible further comprises determining that the response includes data matches at least one pattern defined for the security vulnerability.

8. The method of claim 1, further comprising applying, by the device in response to setting the device to a mode for use of the configuration profile, the configuration profile to the firewall to restrict responses from the server transmitted in response to corresponding requests from at least one of the plurality of clients.

9. The method of claim 1, further comprising providing, by the device for display, information identifying the configuration profile for the firewall to restrict requests of the action type.

10. A system for generating a configuration profile for a firewall, comprising:
    a device having one or more processors coupled with memory that is intermediary between a plurality of clients and a server, configured to:
    modify a request from a client of the plurality of clients to access the server to include a payload provided by the device, the payload comprising a content type selected from a plurality of content types used to probe the server for a corresponding security vulnerability of a plurality of security vulnerabilities;
    transmit, to server, the request including the payload to cause the server to provide a response to the device;

determine that the server is susceptible to a security vulnerability of the plurality of security vulnerability corresponding to the content type based at least on the response; and generate the configuration profile for the firewall to restrict requests of the content type to access the server from the plurality of clients;

wherein modifying the request to access further comprises modifying, in response to setting the device to a mode for generation of the configuration profile using requests from a subset of the plurality of clients, the request from the client to access the server to include the payload.

11. The system of claim 10, wherein the device is further configured to:

determine that the server is not susceptible to a second vulnerability of the plurality of security vulnerabilities corresponding to a second action type of the plurality of action types based at least on a second response to a second request including a second payload comprising the second action type; and generate a second configuration profile for the firewall to permit requests of the second action type to access the server from the plurality of clients.

12. The system of claim 10, wherein the device is further configured to:

determine that a second response from a server is to be restricted in accordance with the configuration profile for the firewall;

identify, based at least on the determination that the second response is to be restricted, a level of violation of the second response; and modify the configuration profile using the level of violation determined for the second response.

13. The system of claim 10, wherein the device is further configured to:

identify, responsive to determining that the server is susceptible to the security vulnerability, at least one of a level of security check or a level of counteraction for the security vulnerability based at least on the response, and generate the configuration profile for the firewall in accordance with at least one of the level of security check or the level of counteraction.

14. The system of claim 10, wherein the device is further configured to:

identify, from the plurality of clients, the client as trusted for generation of the configuration profile and a second client as not trusted; and select the request to access the server from the client identified as trusted to modify to include the payload, concurrent with not selecting a second request to access the server from the second client not identified as a trusted client.

15. The system of claim 10, wherein the device is further configured to:

determine that a second response from the server is transmitted in response to a second request from a second client device of the plurality of clients, the second client device not identified as a trusted client device; and apply a default configuration profile of the firewall to determine whether to permit or restrict the second response from the server.

16. The system of claim 10, wherein the device is further configured to provide, for display, information identifying the configuration profile for the firewall to restrict requests of the action type.

17. A non-transitory computer readable medium storing program instructions for causing one or more processors to:

modify a request from a client of a plurality of clients to access a server to include a payload provided by the one or more processors, the payload comprising a content type selected from a plurality of content types used to probe the server for a corresponding security vulnerability of a plurality of security vulnerabilities;

transmit, to server, the request including the payload to cause the server to provide a response to the one or more processors;

determine that the server is susceptible to a security vulnerability of the plurality of security vulnerability corresponding to the content type based at least on the response; and generate a configuration profile for the firewall to restrict requests of the content type to access the server from the plurality of clients;

wherein the program instructions to modify the request comprise instructions to modifying, in response to setting the device to a mode for generation of the configuration profile using requests from a subset of the plurality of clients, the request from the client to access the server to include the payload.

18. The non-transitory computer readable medium of claim 17, wherein the program instructions further cause the one or more processors to:

determine that the server is not susceptible to a second vulnerability of the plurality of security vulnerabilities corresponding to a second action type of the plurality of action types based at least on a second response to a second request including a second payload comprising the second action type; and generate a second configuration profile for the firewall to permit requests of the second action type to access the server from the plurality of clients.

19. The non-transitory computer readable medium of claim 17, wherein the program instructions further cause the one or more processors to:

identify, from the plurality of clients, the client as trusted for generation of the configuration profile and a second client as not trusted; and select the request to access the server from the client identified as trusted to modify to include the payload, concurrent with not selecting a second request to access the server from the second client not identified as a trusted client.

20. A method of generating a configuration profile for a firewall, comprising:

modifying, by a device that is intermediary between a plurality of clients and a server, a request from a client of the plurality of clients to access the server to include a payload provided by the device, the payload comprising an action type selected from a plurality of action types used to probe the server for a corresponding security vulnerability of a plurality of security vulnerabilities;

transmitting, by the device to the server, the request including the payload to cause the server to provide a response to the device;

determining, by the device, that the server is susceptible to a security vulnerability of the plurality of security vulnerabilities corresponding to the action type based at least on the response;

generating, by the device, the configuration profile for the firewall to restrict requests of the action type to access the server from the plurality of clients; and applying, by the device in response to setting the device to a mode for use of the configuration profile, the configuration profile to the firewall to restrict responses from the server transmitted in response to corresponding requests from at least one of the plurality of clients.

\* \* \* \* \*